(12) United States Patent
Tiberghien et al.

(10) Patent No.: US 10,781,957 B2
(45) Date of Patent: Sep. 22, 2020

(54) FLUID COUPLING ELEMENT AND FLUID-COUPLING COMPRISING SUCH AN ELEMENT

(71) Applicant: STAUBLI FAVERGES, Faverges (FR)

(72) Inventors: Alain-Christophe Tiberghien, Sevrier (FR); Christophe Durieux, Gilly sur Isere (FR); Romain Mayer, Hery sur Ugine (FR)

(73) Assignee: STAUBLI FAVERGES, Faverges (FR)

( * ) Notice: Subject to any disclaimer, the term of this patent is extended or adjusted under 35 U.S.C. 154(b) by 172 days.

(21) Appl. No.: 15/872,179

(22) Filed: Jan. 16, 2018

(65) Prior Publication Data

US 2018/0209573 A1  Jul. 26, 2018

(30) Foreign Application Priority Data

Jan. 24, 2017 (FR) ..................................... 17 50579
Oct. 6, 2017 (FR) ..................................... 17 59392

(51) Int. Cl.
*F16L 37/34* (2006.01)
*F16L 37/30* (2006.01)
*F16L 37/35* (2006.01)

(52) U.S. Cl.
CPC ............... *F16L 37/34* (2013.01); *F16L 37/30* (2013.01); *F16L 37/35* (2013.01); *Y10T 137/87957* (2015.04); *Y10T 137/87965* (2015.04)

(58) Field of Classification Search
CPC . F16L 37/30; F16L 37/32; F16L 37/34; F16L 37/35; Y10T 137/87957; Y10T 137/87965

USPC .......... 137/614.04, 614.05; 251/149.1, 149.6
See application file for complete search history.

(56) References Cited

U.S. PATENT DOCUMENTS

| | | | | | |
|---|---|---|---|---|---|
| 3,073,342 | A | * | 1/1963 | Magorien | F16L 37/34 137/614.03 |
| 3,120,968 | A | * | 2/1964 | Calvin | F16L 37/35 285/277 |
| 3,285,283 | A | * | 11/1966 | Calvin | F16L 37/22 137/614.03 |
| 3,477,468 | A | * | 11/1969 | Kopaska | F16L 37/23 137/614.05 |

(Continued)

FOREIGN PATENT DOCUMENTS

EP     0621430 A2   10/1994
EP      847511 A1    6/1998

(Continued)

*Primary Examiner* — Robert K Arundale
*Assistant Examiner* — Richard K. Durden

(57) ABSTRACT

A fluid coupling element has a body, a valve with a peripheral groove receiving a sealing gasket, a member for resiliently returning the valve, and a skirt positioned inside the body and movable between a first position axially freed relative to the gasket and a second position radially covering the gasket. The element has at least one hitching member axially secured to the skirt and radially movable between a first radial position for axially securing the skirt and the body and for relative axial movement of the valve relative to the skirt, and a second position for axially securing the skirt and the valve and for relative axial movement of the skirt and the body, in a configuration where the skirt covers the gasket.

20 Claims, 17 Drawing Sheets

(56) References Cited

U.S. PATENT DOCUMENTS

| | | | | | |
|---|---|---|---|---|---|
| 3,797,510 | A | * | 3/1974 | Torres | F16K 17/36 |
| | | | | | 137/68.14 |
| 4,098,292 | A | * | 7/1978 | Evans | F16L 37/23 |
| | | | | | 137/614.04 |
| 4,200,121 | A | * | 4/1980 | Walter | F16L 37/32 |
| | | | | | 137/614 |
| 4,583,711 | A | * | 4/1986 | Johnson | F16L 37/23 |
| | | | | | 137/614 |
| 4,664,148 | A | * | 5/1987 | Magnuson | F16L 37/23 |
| | | | | | 137/614.05 |
| 5,806,564 | A | * | 9/1998 | Wilcox | F16L 37/35 |
| | | | | | 137/614 |
| 7,401,627 | B2 | * | 7/2008 | Magnus | F16L 37/34 |
| | | | | | 137/614.03 |
| 2014/0174577 | A1 | * | 6/2014 | Tiberghien | F16L 55/10 |
| | | | | | 137/798 |

FOREIGN PATENT DOCUMENTS

| | | |
|---|---|---|
| GB | 2412956 A | 10/2005 |
| WO | 90/08284 A1 | 7/1990 |

* cited by examiner

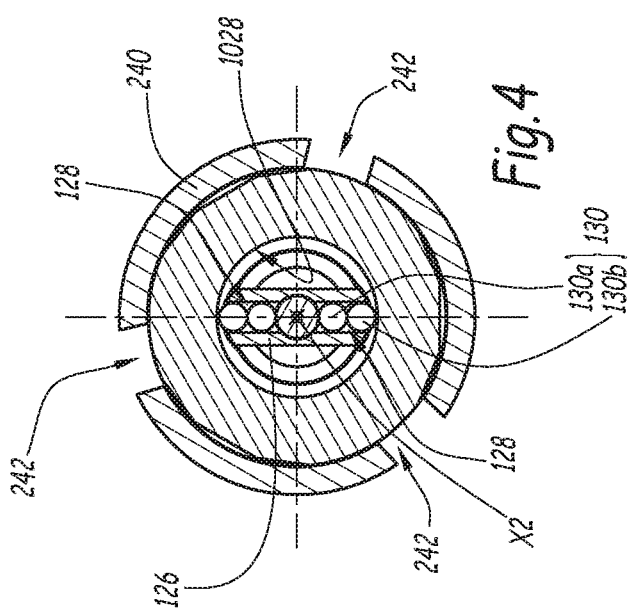
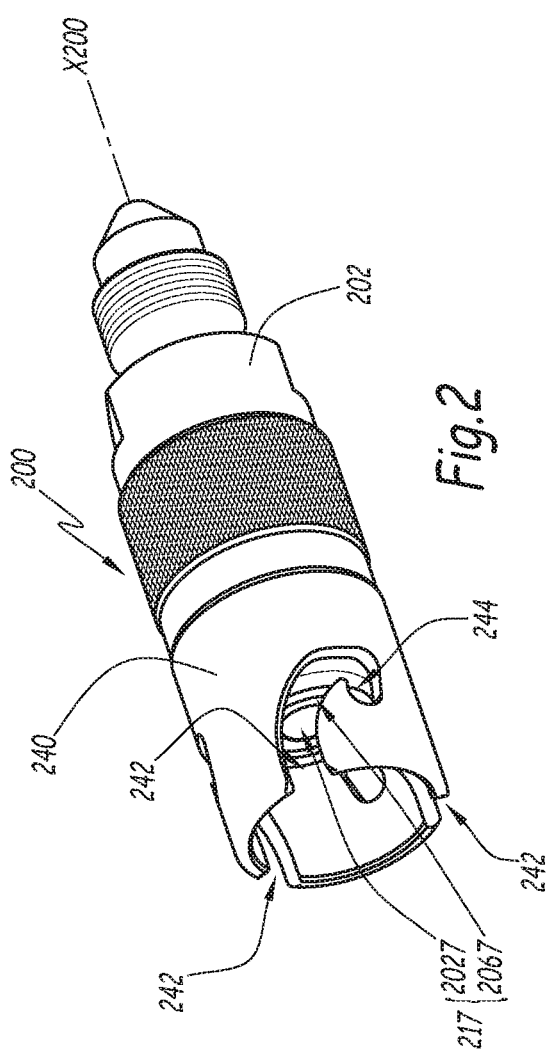
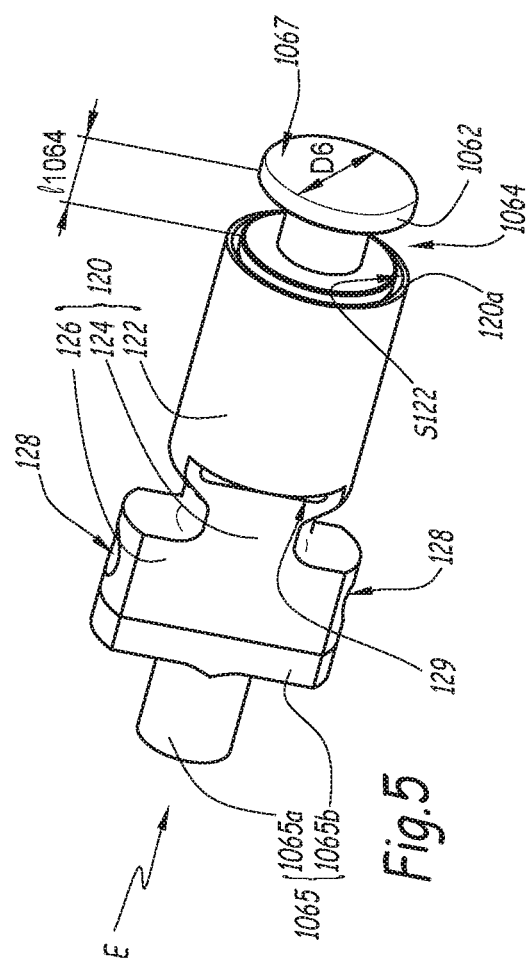

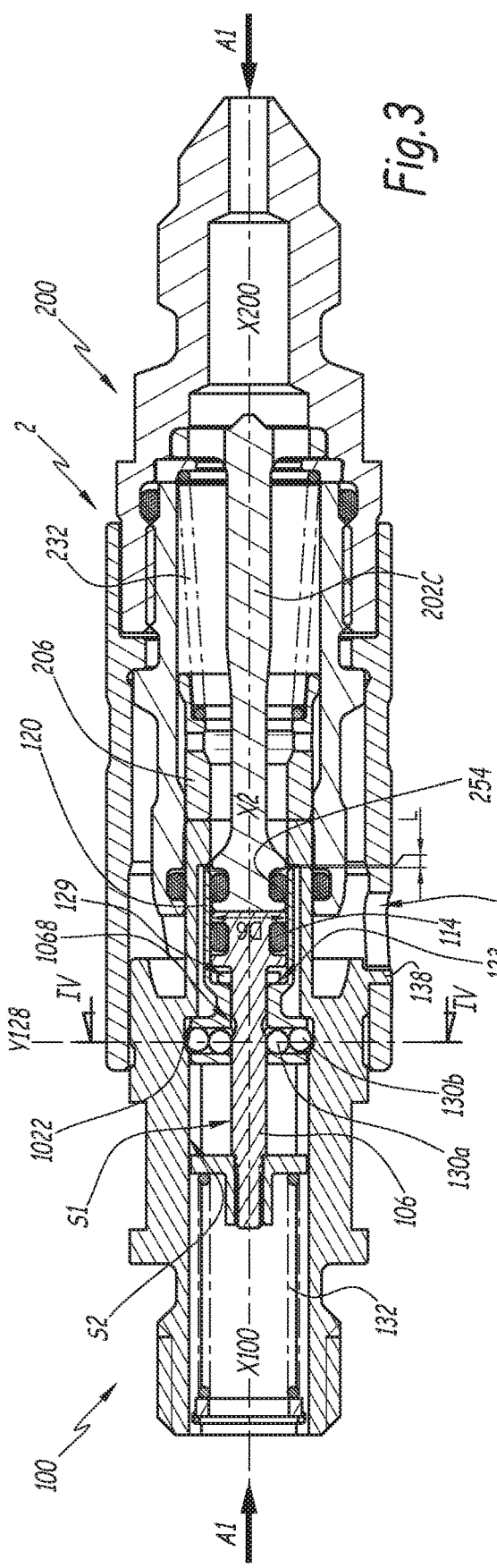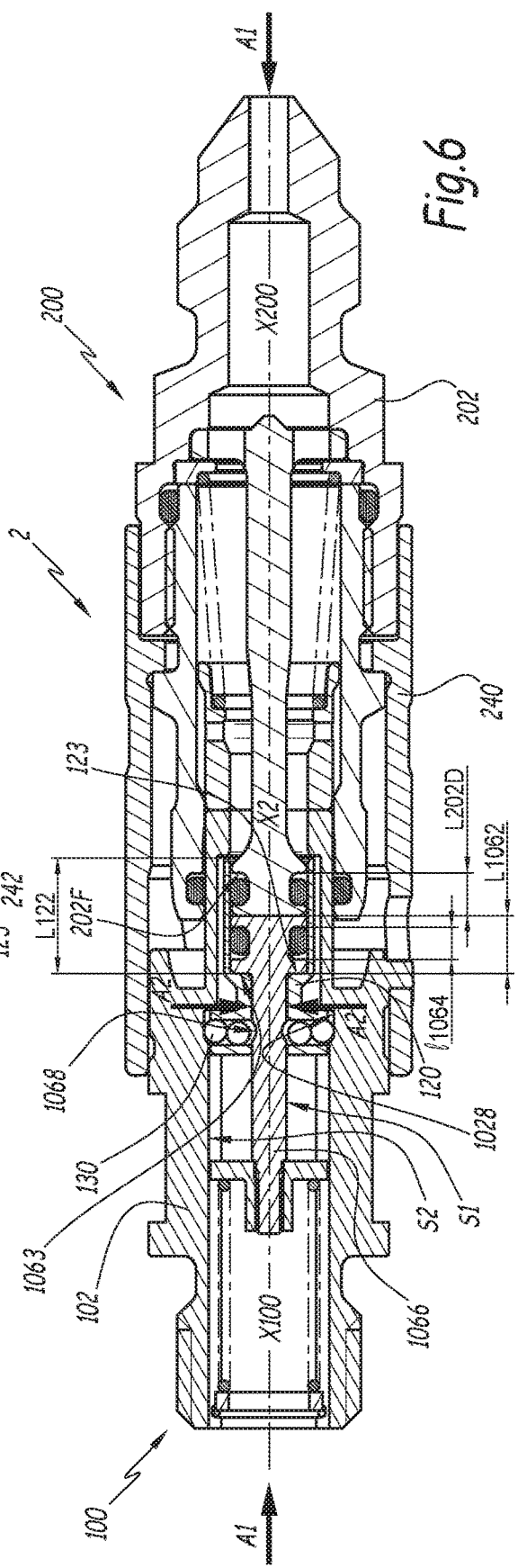

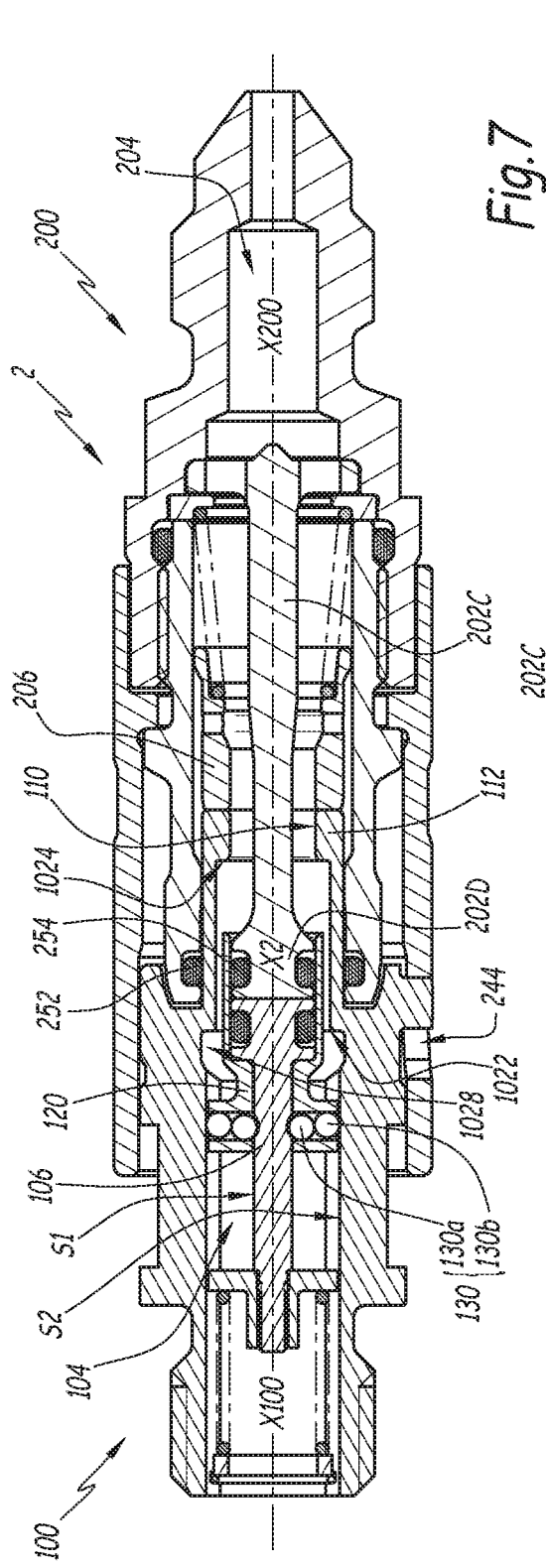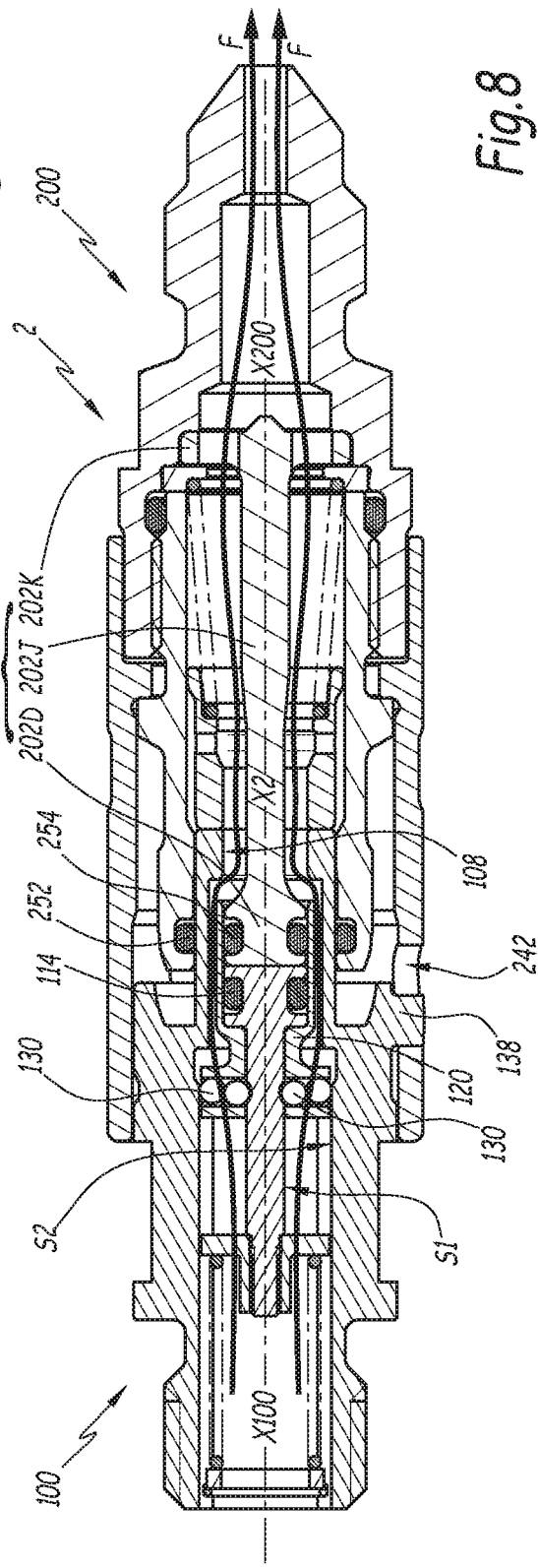

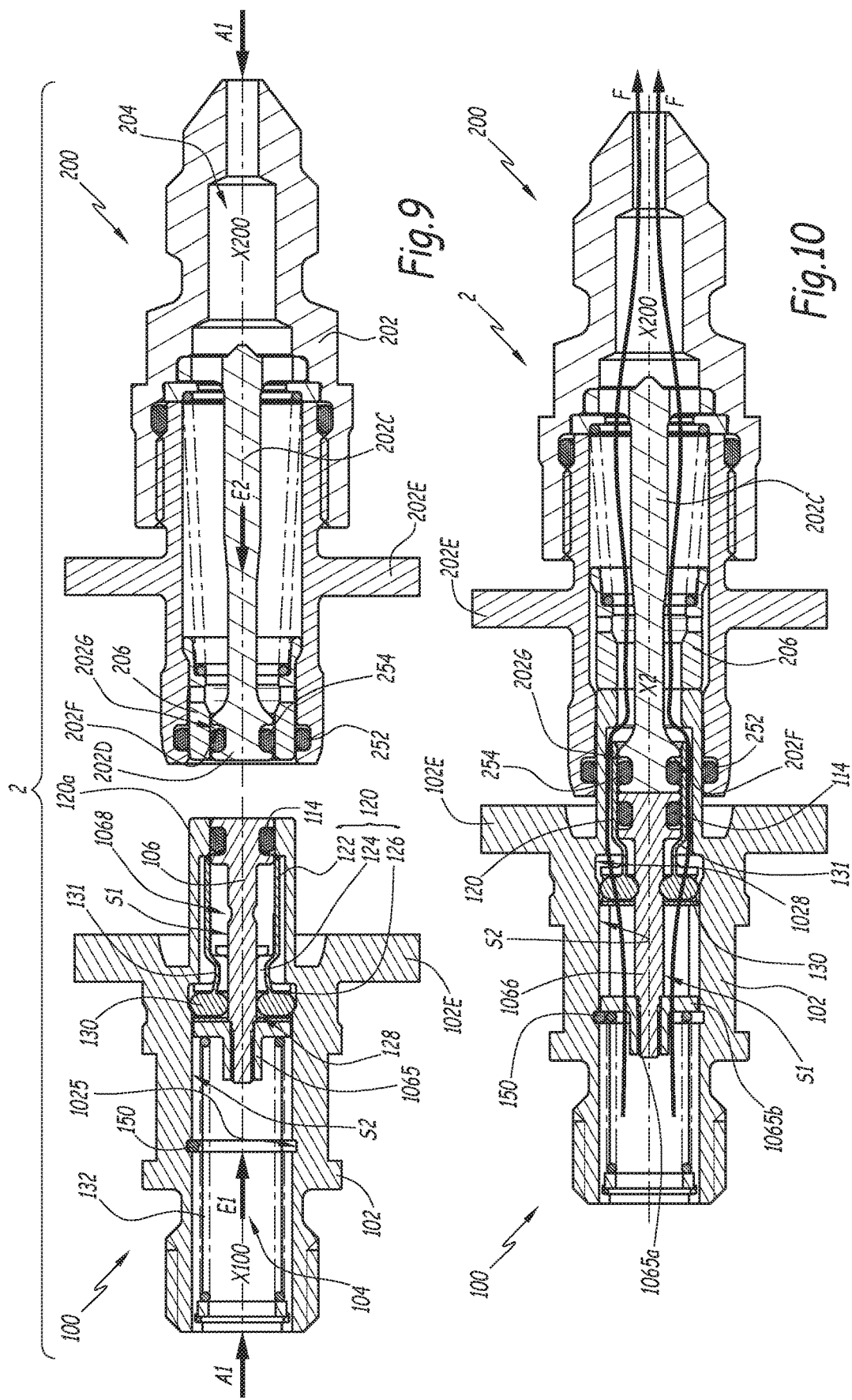

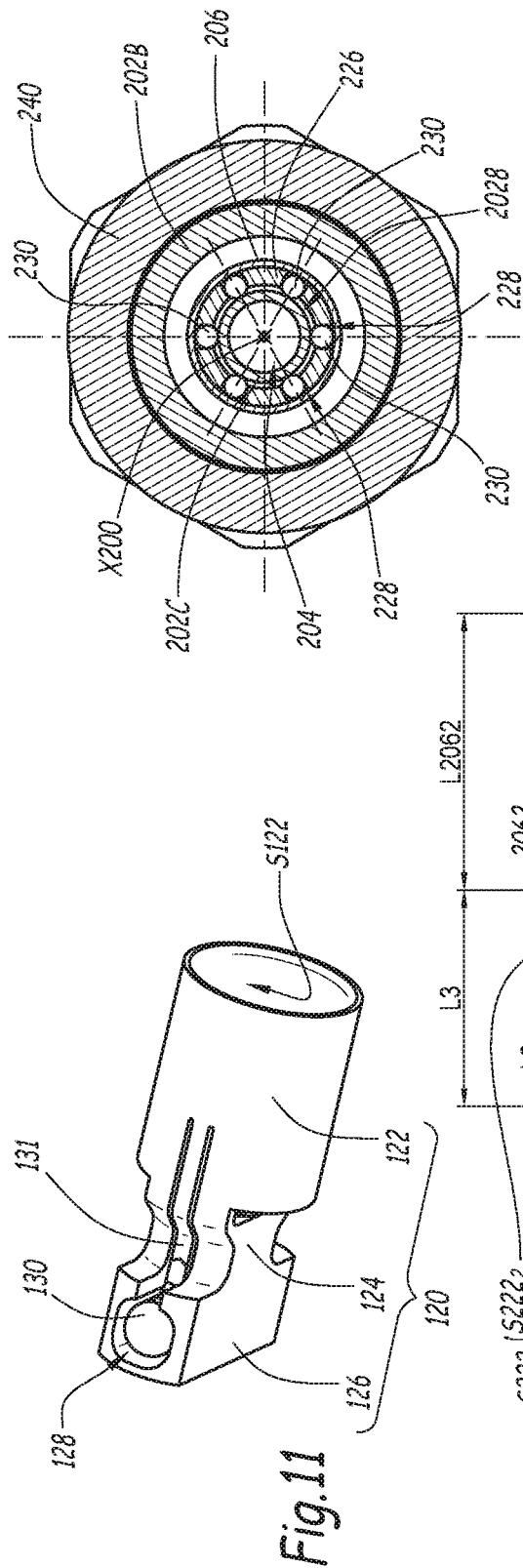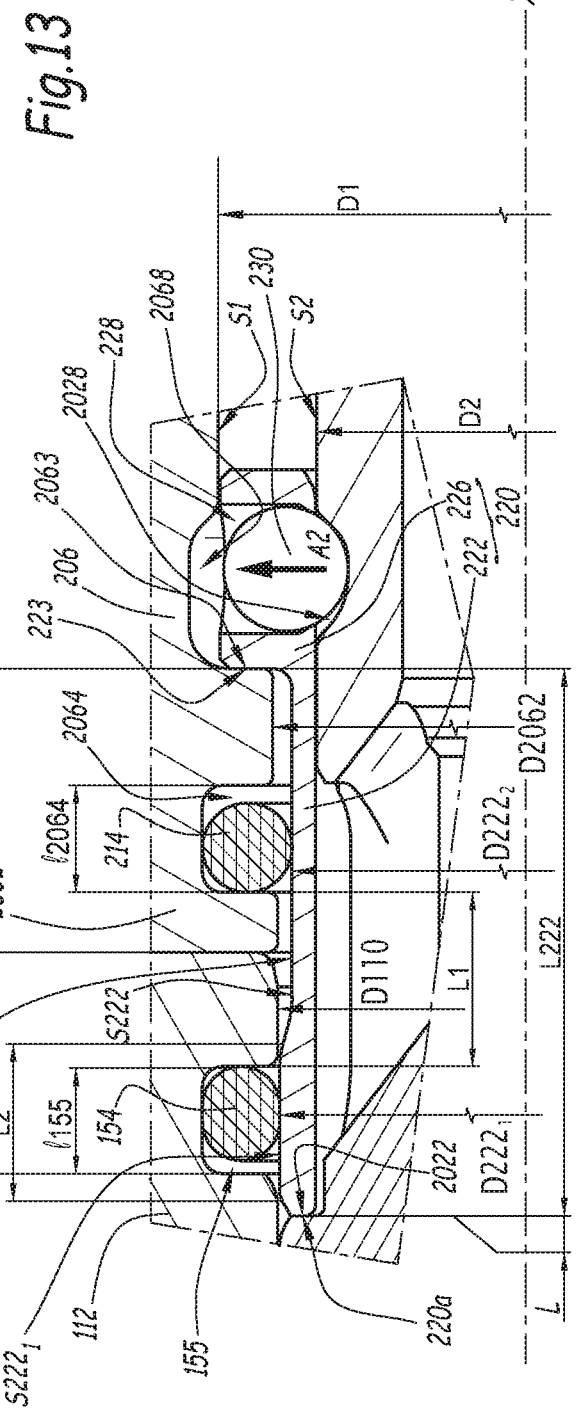

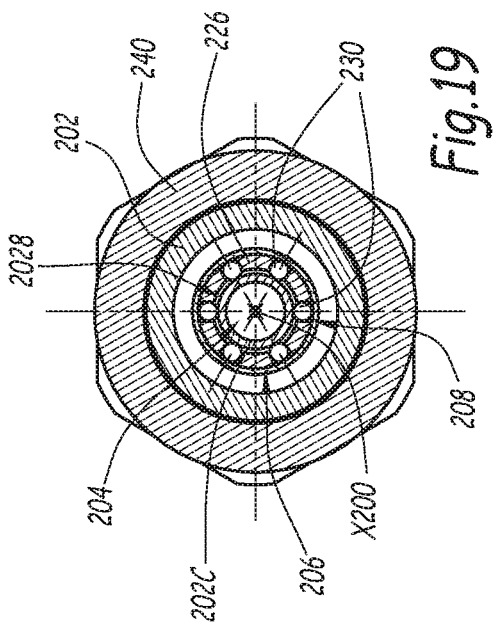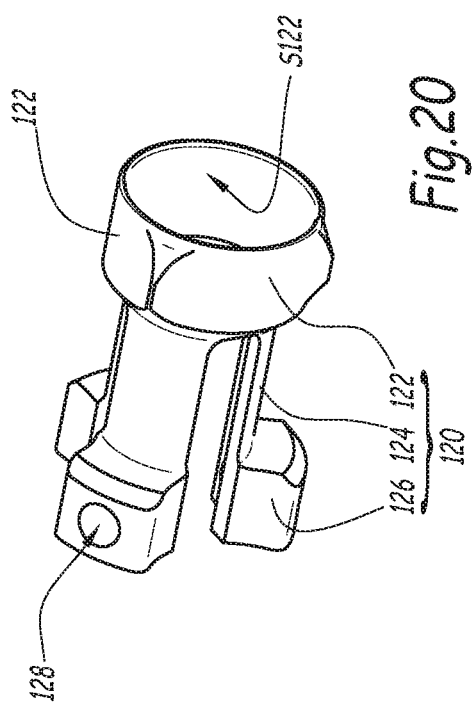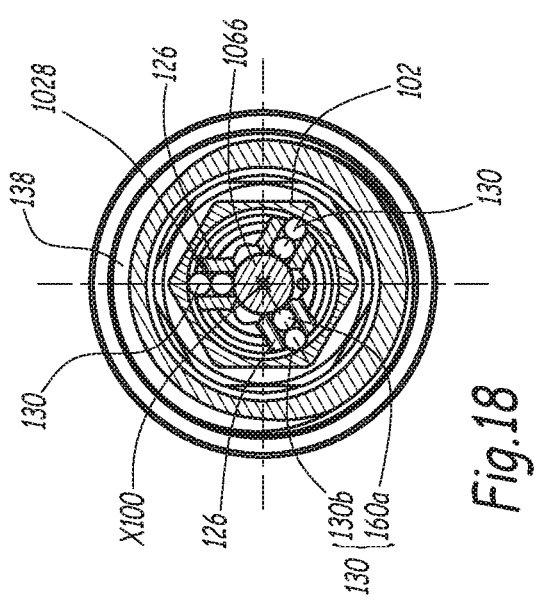

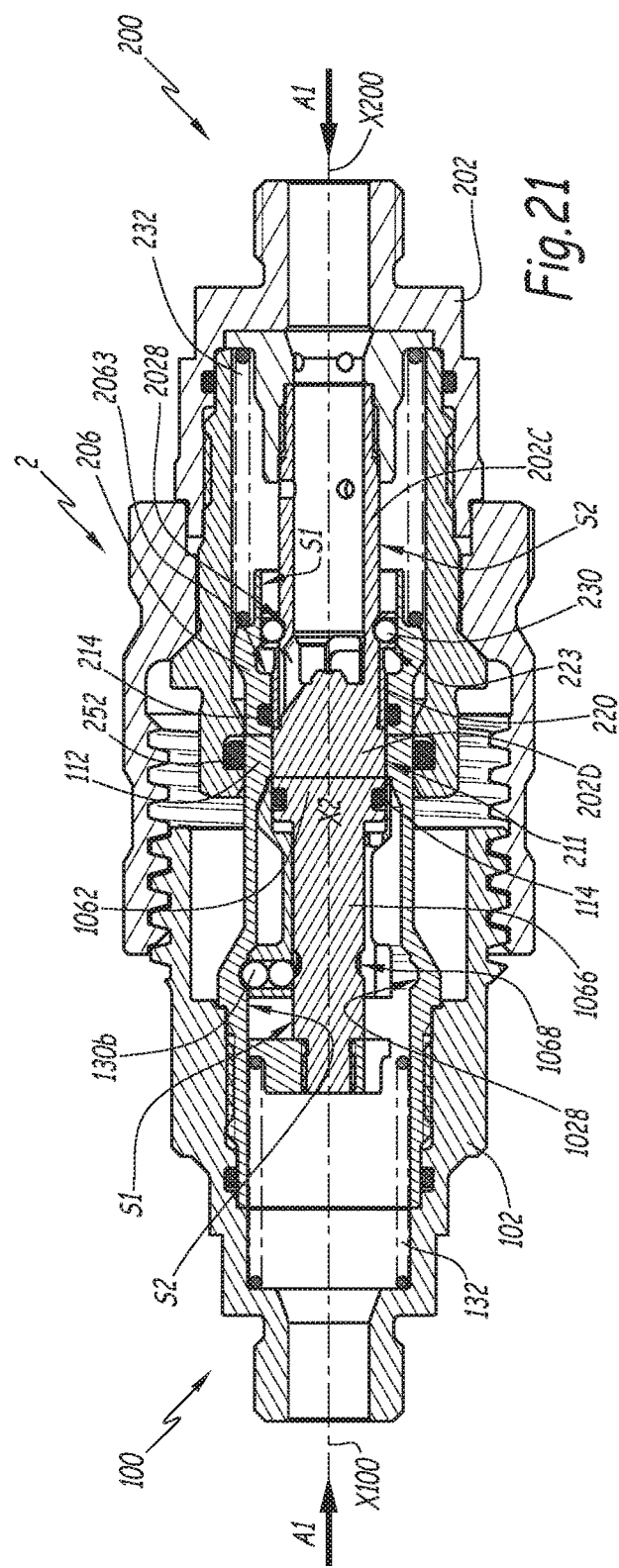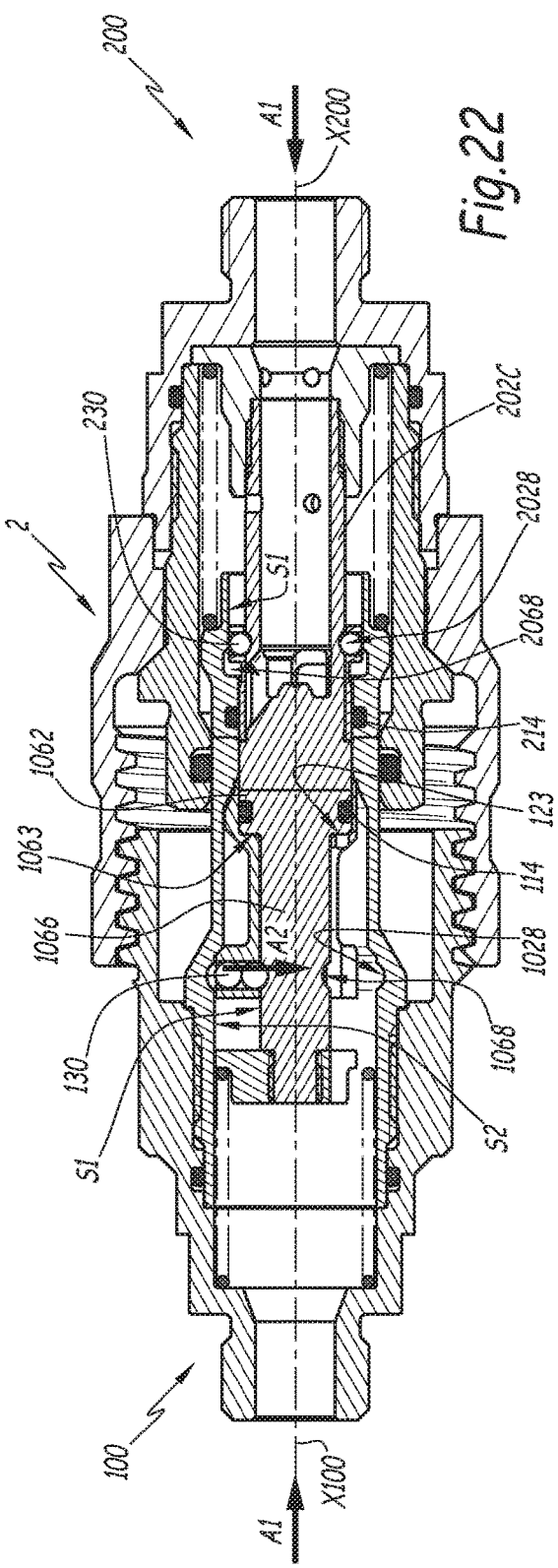

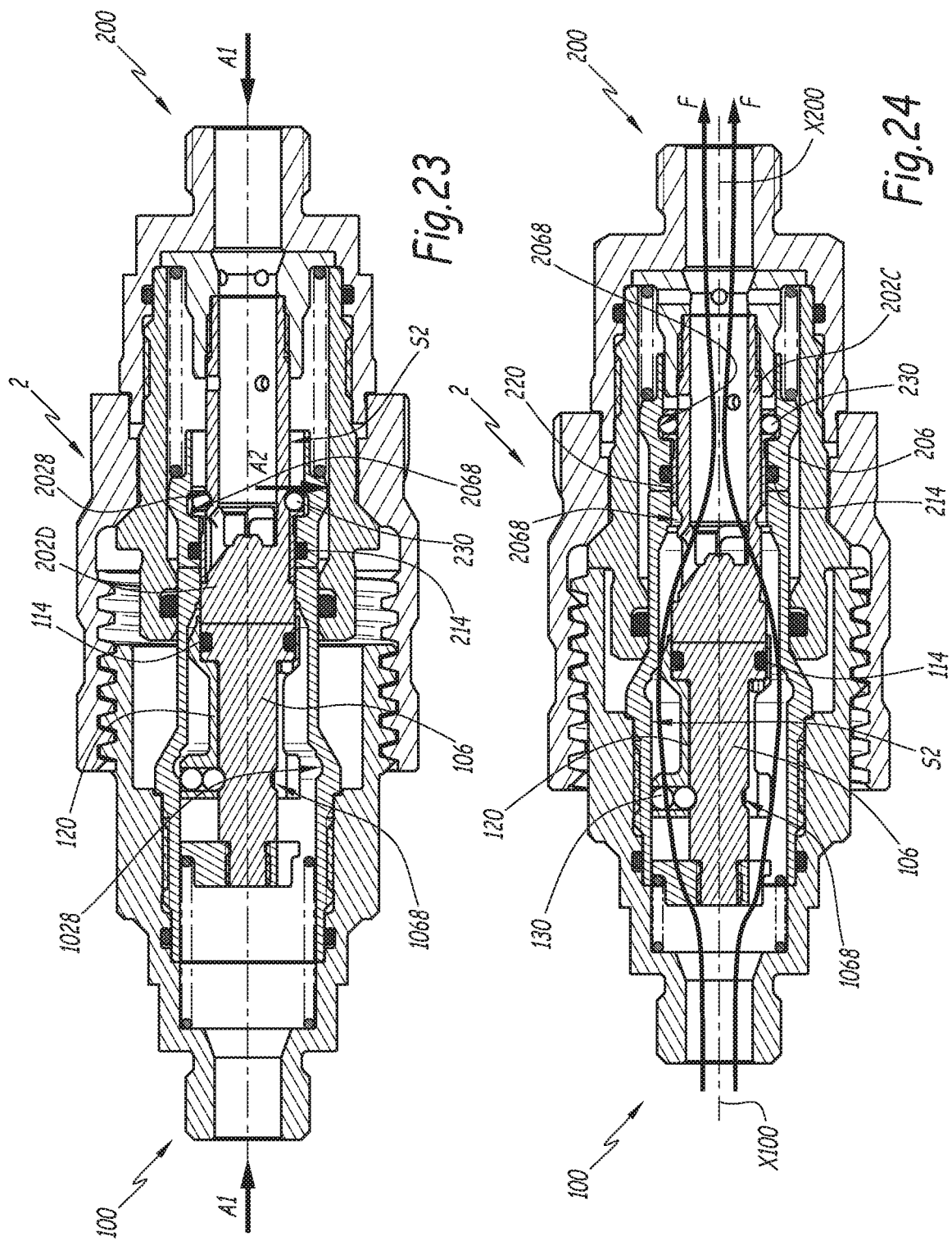

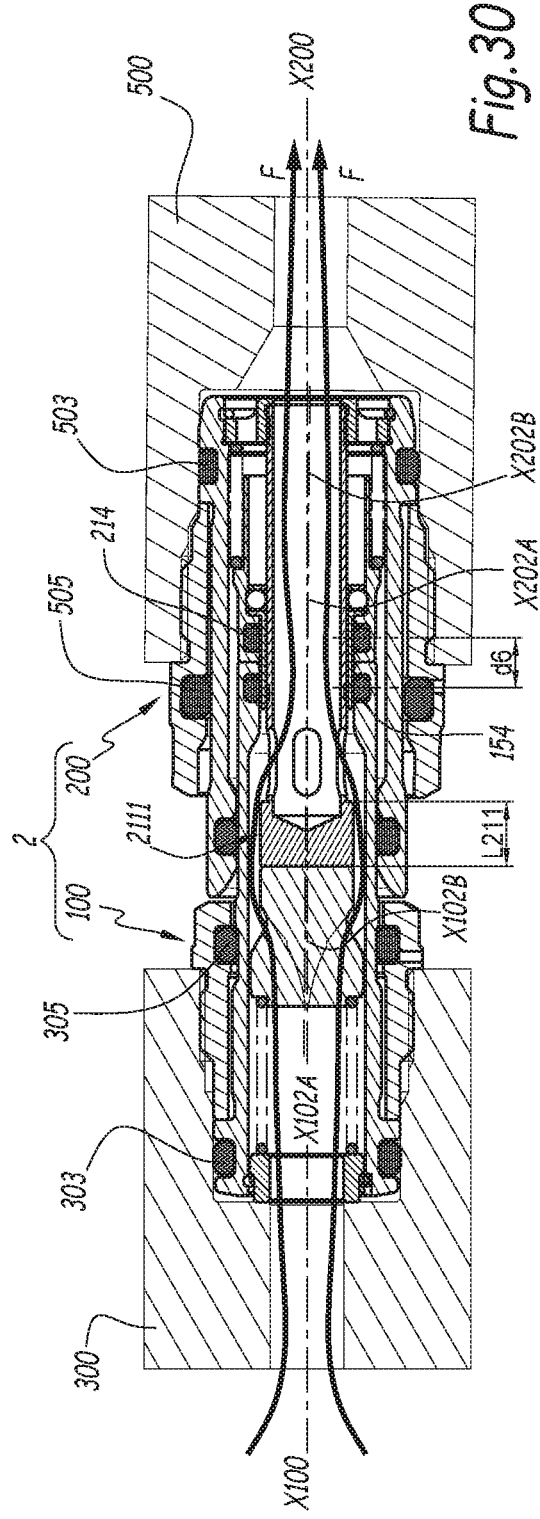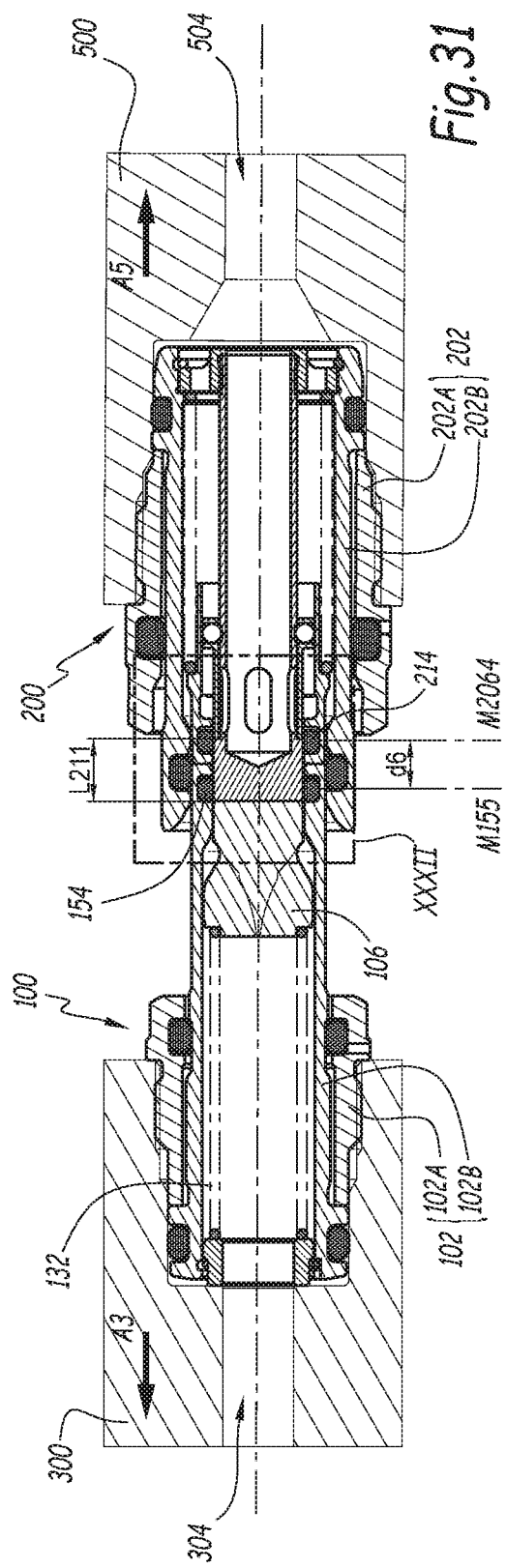

FLUID COUPLING ELEMENT AND FLUID-COUPLING COMPRISING SUCH AN ELEMENT

CROSS-REFERENCE TO RELATED APPLICATIONS

This application claims priority to French patent application no. 1750579, filed Jan. 24, 2017, for which a certified copy and translation was submitted on Jan. 29, 2018, and to French patent application no. 1759392, filed Oct. 6, 2017, for which a certified copy and translation was submitted on Jan. 29, 2018.

STATEMENT REGARDING FEDERALLY SPONSORED RESEARCH OR DEVELOPMENT

Not applicable.

THE NAMES OF THE PARTIES TO A JOINT RESEARCH AGREEMENT REFERENCE TO A "SEQUENCE LISTING"

Not applicable.

STATEMENT REGARDING PRIOR DISCLOSURES BY THE INVENTOR OR A JOINT INVENTOR

Not applicable.

BACKGROUND OF THE INVENTION

The invention relates to a fluid coupling element intended to be connected to a complementary element to allow a fluid to flow within a coupling.

The invention falls within the field of the coupling of fluid pipes, in particular high-pressure fluid or high flow fluid.

It is known to seal a male or female coupling element equipped with a valve using an elastomeric O-ring housed in an annular groove and compressed radially between the valve and a body of the coupling element when the valve is in the closed position. When this type of seal is directly exposed to the pressure and/or flow rate of the fluid traversing the coupling element, it risks being ejected from its groove, which causes leaks in the uncoupled configuration of the coupling elements.

To offset this problem, it is known from EP-A-0,621,430 to use a protective skirt within a male coupling element and another protective skirt within a female coupling element, these skirts being intended to be radially interposed between the fluid traversing the coupling and a seal, during coupling and uncoupling, as well as in the coupled configuration of the coupling elements. This normally prevents the seal from being driven out of its housing. These skirts are pushed by springs toward the front part of each coupling element so that their surface intended to protect the seal is in the extension of a forward part of the coupling element. However, when the fluid flows in the coupling element under high pressure, in particular under a pressure exceeding 200 bars, there is a risk that the force exerted by the spring will not be sufficient to keep the skirt in position and the latter will be pushed back by the pressure from the fluid and expose the seal that it should protect, which is then exposed to the fluid and risks being ejected outside its housing. Similar problems arise when the fluid flows with a high flow rate, in particular more than 80 liters/minute for an inner passage in the coupling with a diameter of 8 mm.

The invention more particularly aims to resolve these drawbacks by proposing a new male or female fluid coupling element that is intended to be coupled to a complementary coupling element to join fluid pipes and that allows effective protection of a sealing gasket equipping a valve of this coupling element, including when the fluid traversing the coupling has a high pressure or flow rate.

BRIEF SUMMARY OF THE INVENTION

To that end, the invention relates to a fluid coupling element comprising a body delimiting a fluid flow pipe and centered on a longitudinal axis, as well as a valve with a radial peripheral groove receiving a sealing gasket, this valve being axially movable relative to the body between a closed position, in which the gasket is in contact with a corresponding seat formed by the body, and an open position, in which the gasket is not in contact with the seat. This coupling element also comprises a resilient return member for returning the valve toward its closed position, as well as a skirt positioned inside the body, this skirt in turn being axially movable relative to the valve, between a first position in which the skirt is axially freed relative to the gasket and a second position in which the skirt radially covers the gasket. According to the invention, the coupling element comprises at least one hitching member axially secured to the skirt and movable, radially with respect to the longitudinal axis relative to the body between a first radial position, in which the hitching member axially secures the skirt and the body and allows a relative axial movement of the valve with respect to the skirt, and a second radial position, in which the hitching member axially secures the skirt and the valve and allows a relative axial movement of the skirt with respect to the body, in a configuration where the skirt radially covers the gasket.

Owing to the invention, the skirt radially covers the gasket supported by the valve and protects it from the main fluid stream and the hitching member makes it possible to secure the positioning of the skirt along the longitudinal axis of the body of the coupling element, in particular relative to the gasket supported by the valve of the coupling element, which prevents untimely movement of the skirt or prevents this gasket from being exposed under the effect of a force exerted by the fluid on the skirt. The risks of direct contact between the fluid and the gasket of the valve are thus minimized. Furthermore, the securing of the skirt with the body or with the valve, owing to the hitching member, makes it possible to use this valve to move the skirt, without having to use a spring.

According to advantageous, but optional aspects of the invention, such a coupling element may incorporate one or more of the following features, considered in any technically allowable combination:

The valve comprises a first surface for blocking the hitching member in its first radial position, as well as a first housing for receiving part of the hitching member in its second radial position, the first housing being adjacent along the longitudinal axis to the first blocking surface, while the body comprises a second surface for blocking the hitching member in its second radial position, as well as a second housing for receiving part of the hitching member in its first radial position, the second receiving housing being adjacent along the longitudinal axis to the second blocking surface.

In the uncoupled configuration, the valve is in its closed position, the skirt is in its first position and the hitching member is kept in its first radial position by the first blocking surface of the valve, while the first receiving housing is positioned in front of the first blocking surface and the second receiving housing is positioned in front of the second blocking surface.

The skirt is configured to abut forward against the body, while the hitching member is in its first radial position.

The valve is configured to abut forward against the skirt in its closed position.

When the member is in its first radial position, the maximum value of an axial distance, measured between the skirt and a part of the body forming the seat, is less than or equal to half, preferably one third, of the width of the radial peripheral groove receiving the gasket, measured parallel to the longitudinal axis.

A surface of the valve is able to abut rearward against the skirt in a configuration where the hitching member is able to come into its second radial position.

The skirt is provided with a tubular portion forming a cylindrical radial surface with a circular section radially covering the gasket and a diameter of this surface is equal to the diameter of the surface of the part of the body forming the seat.

The axial length of the cylindrical radial surface of the tubular portion is strictly greater than an axial length considered between a front face of the valve and the rear abutment surface of the valve.

The skirt is equipped with a radial through housing, in which the hitching member is movable and the hitching member has a radial dimension larger than the radial dimension of the radial through housing.

The hitching member comprises at least one bead, in particular two beads aligned in a direction radial to the longitudinal axis and movable in a same radial through housing of the skirt.

The hitching member forms a single piece with the sealing gasket and is attached to the latter by a portion resiliently deformable in a direction radial to the longitudinal axis.

The axial length of a surface of a part, which constitutes the seat formed by the body, is greater than or equal to twice an axial distance between the axial middle of the radial peripheral groove for receiving the sealing gasket on the one hand, and a front face of the valve on the other hand. The length of the surface of the part that forms the seat makes it possible to ensure that the gasket supported by the valve is in sealed contact with the surface forming the seat and no fluid passage risks pushing the valve back against the action of the resilient member during coupling or uncoupling.

The axial length of the surface of the part that makes up the seat is strictly greater than twice the axial distance between the axial middle of the groove and the front face of the valve, preferably greater than or equal to 2.5 times this axial distance.

The sealing gasket is housed in an outer radial peripheral groove of a front part of the valve, the valve comprises a rod with a radial thickness smaller than a radial thickness of the forward part and the skirt is mounted around the valve, whereas, in its first radial position, the hitching member cooperates with an inner annular groove of the body and, in its second radial position, the hitching member cooperates with an outer annular groove of the rod.

The sealing gasket is housed in an inner radial peripheral groove of the valve, the body comprises a fixed central plunger that forms the seat and a tubular element provided with a second sealing gasket, the valve is mounted sliding around the fixed central plunger and inside the tubular element, whereas, in its closed position, the second gasket is in contact with the valve, the skirt is mounted, radially with respect to the longitudinal axis, between the plunger and the valve, and, in its first radial position, the hitching member cooperates with an outer annular groove of the plunger, whereas, in its second radial position, the hitching member cooperates with an inner annular groove of the valve.

The fixed central plunger is equipped with fluid passage channels from or to an inner volume of the fixed central plunger, whereas the seat, on the one hand, and the second housing, on the other hand, are positioned, along the longitudinal axis, on either side of the radial passages.

According to a second aspect, the invention relates to a fluid coupling for joining pressurized fluid pipes, this coupling comprising a male element and female element provided to fit in one another, at least one of which is as mentioned above.

Advantageously, such a coupling may incorporate one or more of the following features, considered according to any technically allowable combination:

Only a first coupling element, from among the male element and the female element, is as mentioned above, while the valve of the first coupling element is able to be moved toward its open position by a body of the second coupling element, from among the male element and the female element, and whereas, in the coupled configuration, the skirt of the first coupling element is able to radially cover the sealing gasket of the valve of the first coupling element as well as a sealing gasket received in a radial peripheral groove of the body of the second coupling element.

The body of the first coupling element comprises a stop limiting the movement of the skirt toward the rear with respect to the body of the first coupling element, this stop being positioned such that, during coupling, when the hitching member is in its second radial position, the skirt cannot be moved toward an axial position where it does not radially cover the sealing gasket of the second coupling element.

The skirt has a tubular portion with a stepped radial surface, with a front portion and a rear portion that respectively radially cover the gasket of the second coupling element and the gasket of the first coupling element when the hitching member is in its second radial position and, in this configuration covering the gaskets, the radial thickness between the rear portion and the valve of the first coupling element is greater than the radial thickness between the front portion and the body of the second coupling element.

The axial length of the surface of the part that makes up the seat formed by the body of the first coupling element is greater than or equal to a considered axial distance, when the first and second elements of the coupling are being coupled or uncoupled, the front face of the valve of the first coupling element being in contact with the body of the second coupling element, between the axial middle of the radial peripheral groove of the valve on the one hand, and the axial middle of the radial peripheral groove of the body of the second coupling element on the other hand.

The axial length of the surface of the part that makes up the seat is strictly greater than the axial distance between the axial middles of the grooves, preferably greater than or equal to 1.2 times this axial distance.

During coupling of the male and female elements of the coupling, the sealing gasket of the first coupling element is in sealed contact with the surface of the part that makes up the seat and prevents the pressurized fluid from passing between the fluid flow pipe and the front face of the valve, as long as the second sealing gasket of the second coupling element is not in sealed contact with the body of the first coupling element.

During uncoupling of the male and female elements of the coupling, the sealing gasket of the first coupling element according to the invention is in sealed contact with the surface of the part that makes up the seat before the sealing gasket of the second coupling element ceases to be in sealed contact with the body of the first coupling element.

The male coupling element and the complementary female coupling element are as described above, while, in the coupled configuration of the coupling, the hitching members of the male and female coupling elements are each in their second radial position and the valves of the male and female coupling elements are each in their open position.

During coupling of the male and female coupling elements, when the hitching member of a first coupling element, from among these male and female elements, is movable from its first radial position to its second radial position, the hitching member of the second coupling element, from among these male and female elements, is kept in its first radial position by the valve of the second coupling element.

In the coupled configuration of the coupling, the sealing gasket of the valve of the female element and a part of the body of the male coupling element radially surround the skirt of the female coupling element.

BRIEF DESCRIPTION OF THE SEVERAL VIEWS OF THE DRAWINGS

The invention will be better understood and other advantages thereof will appear more clearly in light of the following description of several embodiments of a coupling element and a coupler according to its principle, provided solely as an example and done in reference to the appended drawings, in which:

FIG. 2 is a perspective view of the female element of the coupling of FIG. 1;

FIG. 3 is a sectional view similar to FIG. 1, on a smaller scale, when the male and female coupling elements are in a first configuration, during coupling;

FIG. 4 is a cross-sectional view along line IV-IV in FIG. 3;

FIG. 5 is a perspective view, on a larger scale than FIG. 2, of a piece of equipment comprising a valve and a skirt belonging to the coupling of FIGS. 1 to 4;

FIG. 6 is a sectional view similar to FIGS. 1 and 3 when the male and female coupling elements are in a second configuration, during coupling;

FIG. 7 is a sectional view similar to FIGS. 1, 3 and 6 when the male and female coupling elements are in a third configuration, during coupling;

FIG. 8 is a sectional view similar to FIGS. 1, 3, 6 and 7 in the coupled configuration of the coupling;

FIG. 9 is a sectional view similar to FIG. 1 for a coupling according to a second embodiment of the invention, the male element of which is also according to the invention;

FIG. 10 is a sectional view similar to FIG. 9 in the coupled configuration of the coupling of the second embodiment;

FIG. 11 is a perspective view of a skirt belonging to the coupling of FIGS. 9 and 10;

FIG. 13 is a cross-section along line XIII-XIII in FIG. 12;

FIG. 15 is an enlarged view of detail XV of FIG. 14;

FIG. 18 is a smaller-scale sectional view along line XVIII in FIG. 16;

FIG. 19 is a smaller-scale cross-sectional view along line XIX in FIG. 16;

FIG. 20 is a perspective view of a skirt belonging to the coupling of FIGS. 17 to 19;

FIG. 21 is a sectional view similar to FIG. 17 when the male and female coupling elements are in a first configuration, during coupling;

FIG. 22 is a sectional view similar to FIG. 21 when the male and female coupling elements are in a second configuration, during coupling;

FIG. 23 is a sectional view similar to FIGS. 21 and 22 when the male and female coupling elements are being coupled, in a third configuration;

FIG. 24 is a view similar to FIGS. 21, 22 and 23, in the coupled configuration of the coupling;

FIG. 28 is a sectional view similar to FIG. 25, in the coupled configuration of the coupling of the fifth embodiment;

FIG. 30 is a sectional view similar to FIG. 29, in the coupled configuration of the coupling of the sixth embodiment;

FIG. 31 is a sectional view similar to FIG. 29 during uncoupling of the coupling elements of the coupling of the sixth embodiment.

DETAILED DESCRIPTION OF THE INVENTION

Figure 1:
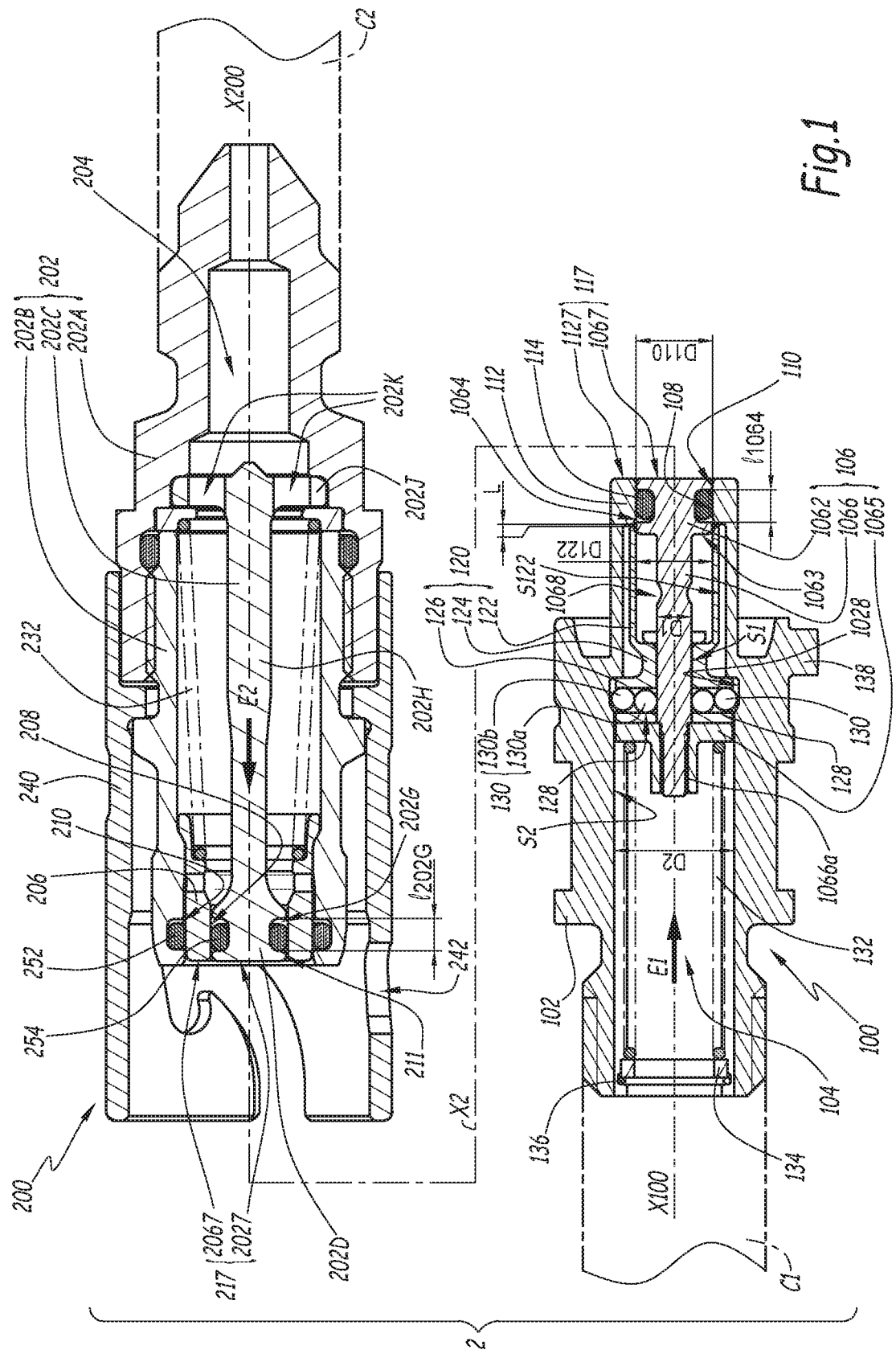
FIG. 1 is an axial sectional view of a coupling according to a first embodiment of the invention, the male and female elements of which are uncoupled, the male coupling element in turn being according to the invention.

The coupling 2 shown in FIGS. 1 to 8 comprises a male coupling element 100 and a female coupling element 200 intended to fit in one another along a central axis X2 of the coupling 2 for removably joining pressurized fluid pipes.

In the usage configuration, the elements 100 and 200 are respectively connected to pipes C1 and C2 in which a pressurized fluid flows, for example a gas under a pressure exceeding 200 bars, for example equal to 300 bars. For the clarity of the drawing, the pipes C1 and C2 are shown only in FIG. 1, in axis lines. Pipes of the same type are used with the male and female elements of the couplings of the other embodiments and are not shown. In the coupled configuration of the coupling 2, the fluid can flow with a high flow rate, for example greater than 80 liters per minute for a passage diameter of the fluid inside the coupling of about 8 mm.

The male coupling element 100 is centered on a longitudinal axis X100 that is intended to be combined with the axis X2 during coupling/uncoupling and in the coupled configuration of the coupling 2 and which defines a front-back direction of the male coupling element 100. The rear of this element 100 is turned toward the pipe C1, while the front of this element is turned toward the female element 200 at the beginning of coupling.

The female coupling element 200 is also centered on a longitudinal axis X200 that is intended to be combined with the axes X100 and X2 during coupling/uncoupling and in the coupled configuration of the coupling. This axis X200 also defines a front-back direction of the element 200, with the rear of this element 200 turned toward the pipe C2 and the front of this element 200 turned toward the male element 100 at the beginning of coupling.

Hereinafter, the adjectives "axial" and "radial" apply in relation to the axis X100 when it involves the male coupling element 100 and in relation to the axis X200 when it involves the female coupling element 200. Thus, for example, a length or distance is said to be "axial" when it is parallel to the considered axis, while a surface is said to be "axial" when it is perpendicular to this axis and "radial" when it is perpendicular to a ray passing through this axis. A direction is said to be centripetal, respectively centrifugal, when it is radial and convergent, respectively radial and divergent, with respect to this axis. This is also valid for the other embodiments. The male coupling element 100 comprises a body 102 that is shown in one piece in the figures, but which may be made up of several parts assembled to one another. This body 102 is centered on the axis X100 and pierced with a central bore 104 that defines a fluid flow pipe inside the male coupling element 100, this pipe being closed off by a valve 106 equipped with a sealing gasket that comes into sealed contact against a seat 108 in the uncoupled configuration of the coupling 2. This seat 108 is arranged on an inner radial surface 110 of the body 102, which in turn is positioned at a forward end 112 of the male coupling element 100. Reference D110 denotes the diameter of the surface 110, which is circular. The valve 106 comprises a forward part 1062 with an outer diameter D6.

The part 1062 is equipped with an outer peripheral groove 1064 in which an elastomeric O-ring gasket 114 is received that comes into sealed contact against the seat 108 in the closed configuration of the male coupling element 100 while being radially compressed between the seat 108 and the valve 106. Reference ℓ1064 denotes the width of the groove 1064, i.e., the axial dimension of this groove.

The valve 106 also comprises a rod 1066 that is in one piece with the part 1062 and prolongs it in the rear direction, i.e., away from a front face 117 of the male coupling element 100. A rear stop surface 1063 defines the part 1062 in the rear.

Reference 1067 denotes the front face of the valve 106, which is in the shape of a disc centered on the axis X100. Reference 1127 denotes the front face of the end 112, which is in the shape of an annulus centered on the axis X100. The front faces 1067 and 1127 together constitute the front face 117. In the uncoupled configuration of the coupling, the front faces 1067 and 1127, which are perpendicular to the axis X100, are planar and flush with one another, such that the front face 117 is planar.

Reference L1062 denotes the axial length of the part 1062. The length L1062 is measured along the longitudinal axis X100, between the rear stop surface 1063 and the front face 1067.

Opposite the part 1062, the rod 1066 is provided with a thread 1066a on which a nut 1065 is screwed that comprises a tapped circular portion 1065a and a pad 1065b that extends globally in two opposite radial directions relative to the tapped part 1065a and that is in a single piece with the part 1065a. The geometry of the nut 1065 emerges from the comparison of FIGS. 1 and 5.

The rod 1066 is equipped with an outer peripheral groove 1068 that constitutes a hollow housing, radially toward the axis X100, relative to the outer radial surface of the rod 1066. Reference D1 denotes the diameter of the rod 1066 outside the groove 1068, this diameter being strictly smaller than the diameter D6. In other words, the front part has a radial thickness, relative to the axis X100, greater than that of the rod 1066, these radial thicknesses corresponding, in the example, to the radii of these parts, i.e., respectively to half of the diameter D6 and half of the diameter D1.

The gasket 114 is not shown in FIG. 5, in order to allow better viewing of the groove 1064.

Reference S1 denotes the part of the outer radial surface of the rod 1066 situated between the thread 1066a and the annular groove 1068. This surface S1 is cylindrical with a circular section and diameter D1.

A skirt 120, made in the form of a ring, is mounted around the valve 106 and comprises a tubular portion 122, with a circular section, the inner diameter of which is denoted D122, which is equal to the diameter D110, and S122 denotes the inner radial surface, which is cylindrical with a circular section. The skirt 120 also comprises a connecting portion 124 that connects the tubular part 122 to a rear tab 126 of the skirt 120, the portion 124 and the rear tab being pierced by an axial central hole for the passage of the rod 1066. In the rear tab 126, two housings 128 are defined that extend along the same axis Y128, which are radial with respect to the axis X100 and are through housings, i.e., they each emerge both inside the skirt 100 toward the central longitudinal axis X100 and outside the latter, in a radial direction parallel to the axis Y128.

Reference L122 denotes the axial length of the surface S122. The axial length L122 is defined between a front edge 120a of the skirt 120 and an inner shoulder 123 of the skirt arranged at the junction of the portions 122 and 124. This length L122 is strictly greater than the length L1062, preferably greater than or equal to twice the length L1062.

The skirt 120 is also provided with two cutouts 129 that extend, on either side of the axis X100 in the mounted configuration of the male coupling element 100, at the junction between the portions 122 and 124 and that make it possible to discharge fluid present in the inner volume of the tubular portion 122 in case of relative movement between the skirt 120 and the valve 106 in a direction bringing the parts 124 and 1062 closer together.

The valve 106 and the skirt 120 together constitute a piece of equipment E inside the male coupling element 100, which is shown in perspective view in FIG. 5.

A pair 130 of beads 130a and 130b, aligned in a direction radial to the axis X100, is positioned in each housing 128. In each pair of beads 130, reference 130a denotes the bead closest to the rod 1066 and 130b denotes the furthest away. In practice, each radial housing 128 is a piercing with a circular section arranged in the flange ring 126 with a diameter slightly larger than the diameter of the beads 130a, 130b that it receives. Each bead 130a, 130b is therefore axially secured to the skirt 120.

The radial dimension of each pair of beads 130 is larger than the radial height of each housing 128, i.e., the dimension of this housing measured radially to the axis X100. In practice, when the beads 130a and 130b have the same diameter, like in the example of the figures, the diameter of the beads 130a and 130b is chosen to be strictly greater than half the radial height of each housing 128. Each pair of beads 130 positioned in a housing 128 thus protrudes continuously from this housing, either radially outward, or radially inward toward the axis X100, relative to the rear tab 126. Each pair of beads 130 constitutes a member for hitching the skirt 220 to the body 102 or to the valve 106, as shown by the following explanations.

A spring 132 bears, on the front, against the pad 1065b, as well as, on the rear, against a ring 134 blocked in the rear direction in the body 102 by a circlips 136. This spring 132 exerts, on the pad 1065b and therefore on the valve 106, an axial force E1 oriented in the forward direction that tends to return the valve 106 toward its position closing the pipe 104, at the front end 112.

The body 102 is provided with an inner radial peripheral groove 1028 intended to receive part of each of the beads 130b. Reference S2 denotes the inner radial surface of the body 2 that defines the bore 104 at the rear of the groove 1028. Reference D2 denotes the diameter of this surface S2, which is cylindrical with a circular section. This diameter D2 is smaller than the groove bottom diameter of the groove 1028. Thus, the groove 1028 extends in a hollow, radially opposite the axis X100, relative to the surface S2. The surface S2 is positioned, along the axis X100, between the groove 1028 and the ring 134 while bearing against the circlips 136.

The body 102 is equipped with three lugs 138 that extend radially protruding relative to the rest of the body 102 and only one of which is visible in the figures, having specified that these three lugs 138 are regularly distributed around the axis X100.

The female element 200 comprises a body 202 centered on the axis X200 and that is provided with a central bore 204 forming a pressurized fluid passage pipe. The body 202 has multiple parts and comprises two tubular elements 202A and 202B, as well as a fixed central plunger 202C. The fixed central plunger 202C comprises a front end or head 202D, a central rod 202H that extends along the axis X200 and a rear flange 202J, pierced with passages 202K for the fluid and that is axially immobilized by axial gripping between the tubular elements 202A and 202B. Reference 2027 denotes the front face of the plunger 202C.

The female coupling element 200 also comprises a valve 206 that is mounted axially movable around the fixed central plunger 202C, radially inside the tubular element 202B and that is elastically charged toward a closed position by a spring 232 inserted between the valve 206 and the body 202 and that exerts an axial force E2.

Reference 2067 denotes the front annular face of the valve 206. In the uncoupled configuration of the coupling, the front faces 2027 and 2067, which are perpendicular to the axis X200, are flush with one another, such that the front face 217 of the female coupling element 200 made up of the front faces 2067 and 2027 is planar, radially inside the tubular element 202B.

The body 202 is equipped with two elastomeric O-rings 252 and 254 respectively installed in an inner peripheral groove at an inner radial peripheral surface 210 of the tubular element 202B and in an outer peripheral groove 202G arranged at an outer radial peripheral surface 211 of the front end or head 202D of the fixed central plunger 202C.

In the closed position of the valve 206, the O-rings 252 and 254 are compressed radially between the body 202 and the valve 206.

Reference L202D denotes the axial length of the head 202D, measured between the front face 2027 and a rear edge 202F of the groove 202G.

The length L122 is greater than or equal to the sum of the lengths L1062 and L202D. This allows the skirt 120 to accommodate the front part 1062 and the head 202 in the inner volume of the tubular portion 122.

The female coupling element 200 also comprises a ring 240 that is mounted rotating around the body 202, relative to the axis X200 and which is equipped with three slots 242 each intended to receive a lug 138 that moves inside the slot during coupling of the male and female coupling elements 100 and 200, until reaching a seat 244 provided at the bottom of each slot. The ring 240 is axially maintained relative to the body 202 between the tubular elements 202A and 202B.

The coupling 2 works as follows:

In the uncoupled configuration, shown in FIG. 1, the skirt 120 is pushed back, by the pad 1065a subject to the elastic force E1 that comes into contact with the rear tab 126, in the forward direction to the point that its tab 126 abuts forwardly against an inner shoulder 1022 of the body 102. The shoulder 1022 delimits the annular groove 1028 in the forward direction. In this configuration, the front edge 120a of the skirt 120, i.e., the edge of the tubular portion 122 opposite the connecting portion 124, is not in contact with the front end 112 of the body 102. In other words, in the uncoupled configuration, a distance L, measured axially between the edge 120a and an inner shoulder 1024 of the body 102, which delimits the end 112 in the rear direction and which delimits, in the forward direction, a portion of the pipe 104 having an inner diameter larger than the diameter D110, is not zero and can vary slightly in light of the machining allowances and friction.

In this configuration the valve 106 is in the closed position of the male element 100. In particular, the gasket 114 cooperates sealably with the surface 110, at the seat 108.

In this uncoupled configuration, the beads 130a bear on the surface S1, such that they push the beads 130b radially back toward the outside, in the groove 1028 that forms a receiving housing for the outer part of each bead 130b. The skirt 120 is thus secured by both pairs of beads 130, in translation along the axis X100, with the body 102 and the skirt 120 is axially freed relative to the gasket 114.

At the beginning of coupling of the male and female elements 100 and 200, these coupling elements are aligned on the axis X2, then are brought closer to one another in the direction of the arrows A1 in FIG. 3. This results in bringing the front face 2027 of the fixed central plunger 202C into contact with the front face 1067 of the valve 106, while the front face 1127 of the male body is brought into contact with the front face 2067 of the valve 206.

By continuing the coupling movement, and at the same time as the fixed central plunger 202C penetrates the front end 112 of the body 102, the gaskets 252 and 254 respectively bear against the outer and inner radial surfaces of this end 112. In particular, with the gasket 252, the sealing is therefore engaged between the body 202 and the body 102.

During the coupling of the male and female elements 100 and 200, the fixed plunger 202C comes into contact with the valve 106 and the valve 106 is pushed back by the fixed plunger 202C toward the rear of the male coupling element 100, toward its open position, against the force E1, to the point that its front part 1062C engages in the tubular portion 122 of the skirt 120, which cannot withdraw relative to the body 102, since it is axially secured thereto by the beads 130b. This is in particular possible because the diameters D110 and D122 are the same. As the valve 106 progresses toward the rear of the male coupling element 100, the gasket 114 penetrates the inside of the skirt 120, to the point that it is protected against the pressure of any fluid that may be contained in the male element 100 and against the fluid flow intended to flow in the coupling 2 when the male and female elements 100 and 200 are actually coupled.

During the sliding movement of the valve 106 toward the rear of the body 102, because of the relative axial immobilization of the elements 120 and 102 by the pairs of beads 130 engaged in the groove 1028, the distance L is continuously less than or equal to half of the width ℓ 1064, preferably less than or equal to one third of the width ℓ 1064. Thus, the maximum value $L_{max}$ of the distance L, when the pairs of beads 130 are in their first radial position, is less than or equal to ℓ 1064/2, preferably to ℓ 1064/3. This can be obtained owing to an appropriate choice of the axial dimensions of the skirt 120 relative to the axial dimensions of the body 102 and the valve 106.

Since the value $L_{max}$ is less than or equal to half the width ℓ 1064, preferably less than or equal to one third of the width ℓ 1064, the gasket 114 does not risk being driven out of the groove 1064 by the pressure from the fluid when the gasket 114 goes from the inside of the end 112 to the inside of the skirt 120. During the first movement phase of the valve 106 toward the rear of the body 102, the skirt 120 remains fixed, along the axis X100, relative to the body 102, since it is hitched, via the two pairs of beads 130, to this body 102, inasmuch as the outer beads 130b are blocked in the groove 1028 by the beads 130a and by the surface S1, which moves axially relative to the beads 130a, 130b.

The continued fitting movement results in the gasket 254 leaving the part 112, while the valve 206 is pushed back in the body 202, which opens the fluid communication between the two elements 100 and 200 of the coupling 2, to cause the head 202D of the fixed central plunger 202C to penetrate fully inside the skirt 120, still bearing against the valve 106, to the point that the gaskets 114 and 254 are covered, radially from the outside, by the skirt 120. This is in particular possible due to the relationship L122≥L1062+L202D set out above.

The maximum value $L_{max}$ of the distance L is less than or equal to half the width ℓ 202G of the groove 202G, preferably less than or equal to one third of the width ℓ 202G. This also guarantees that the gasket 254 remains protected from the pressure of the fluid and is not removed from its groove 202G under the action of the fluid.

One then reaches the configuration of FIGS. 3 and 4, where, relative to the configuration of FIG. 1, the inner beads 130a have slid or rolled along the surface S1, while the outer beads 130b have remained engaged in the groove 1028.

During the movement making it possible to go from the configuration of FIG. 1 to that of FIGS. 3 and 4, the lugs 138 have progressed in the slots 242, with a bayonet operation made easier by the possibility of rotation of the ring 240 around the body 202.

By further continuing the coupling movement, one then reaches the configuration of FIG. 6, where the rear stop surface 1063 of the front part 1062 of the valve 106 has come to abut against the inner shoulder 123. In other words, the valve 106 axially abuts, rearward, against the skirt 120.

In this configuration, shown in FIG. 6, the movement of the valve 106 inside the body 102 has resulted in bringing the groove 1068 across from the pairs of beads 130, which eliminates the centrifugal force exerted previously by the surface S1 on these beads.

With the continued fitting movement, the beads 130a and 130b can thus have, in their housing 128 and relative to the body 102, a centripetal movement represented by the arrows A2 in FIG. 6, which engages the beads 130a in the groove 1068.

The coupling movement of the elements 100 and 200 then occurs due to the progression of the lugs 138 inside the slots 242, which results in pushing the valve 106 further back toward the rear of the male coupling element 100. This additional withdrawal movement of the valve 106 is possible because the outer beads 130b can leave the groove 1028, the beads 130a can become housed in the groove 1068 and the outer beads 130b can slide or roll along the surface S2. This surface S2 exerts, on the pairs of beads 130, a centripetal force, in the direction of the arrows A2 set out above, which results in blocking the pairs of beads 130 in the groove 1068. The inner radial part of the beads 130a that is engaged in the groove 1068 axially secures the elements 106 and 120. Thus, in this configuration, the pairs of beads 130 axially secure the skirt 120 and the valve 106.

When the lugs 138 reach the bottom of the slots 242, the valve 106 and the skirt 120 have reached their maximum rear position inside the body 102, while the valve 206 has reached its maximum rear position inside the body 202. This is the configuration shown in FIG. 7.

Due to the rotation of the ring 240 around the body 202 and the repulsion effects due to the forces from the springs 132 and 232, the lugs 138 are guided toward the seats 244, which causes a short displacement in the opposite direction making it possible to reach the configuration of FIG. 8, where the male and female coupling elements 100 and 200 are coupled while being locked together owing to the bayonet mechanism 138/242, such that the coupling elements 100 and 200 may not be separated from one another. The valve 106 is in its open position, and the fluid can flow between the two coupling elements. The pairs of beads 130 axially secure the skirt 120 and the valve 106 in a configuration where this skirt effectively protects the gaskets 114 and 254 against the pressure and flow of the main fluid stream shown by the arrows F in this FIG. 8, the skirt 120 being radially inserted between these gaskets and this fluid stream and completely covering, radially by the outside, the grooves 1064 and 202G, and therefore the gaskets 114 and 254, such that the gaskets 114 and 254 are radially compressed between the valve 206, respectively the plunger 202C, and the skirt 120. The skirt 120 is axially withdrawn toward the rear relative to the front end 112 of the body 102, such that it does not hinder the flow of the fluid stream shown by the arrows F that occurs around the skirt 120.

The uncoupling takes place according to a reverse maneuver with respect to that described above. This uncoupling begins with an over-travel in the direction of the arrows A1, to release the lugs 138 from the seats 244 and to engage these lugs in the slots 242 toward their respective mouths. Next, the male coupling element 100 is removed from the female coupling element 200. The forces E1 and E2 contribute to separating the coupling elements 100 and 200 from one another by pushing the valves 106 and 206 back toward their respective closing positions. At the beginning of this removal movement, the skirt 120, which is secured to the valve 106 due to the action of the hitching beads 130a, follows the movement of this valve by bearing on the fixed central piston 202C, the valve being pushed back by the resilient force E1 of the spring 132, which acts on the valve 106 and on the skirt 120, while the valve 206 is pushed back by the resilient force E2 of the spring 232. Due to this movement, the skirt 120 moves toward the front of the male coupling element 100 and the beads 130b arrive across from the groove 1028, while the skirt 120 again abuts on the front against the shoulder 1022. The continued removal of the male coupling element 100 with respect to the female coupling element 200, with the valve 106 pushed back by the spring 132, brings the surface S1 of the rod 1066 across from the beads 130a, which results in engaging the beads 130b again in the groove 1028, following a centrifugal movement opposite the movement shown by the arrows A2. This amounts to axially securing the skirt 120 and the body 102. In this configuration, which approximately corresponds to that of FIG. 3, the gaskets 114 and 254 are still covered by the skirt 120. They are therefore protected against the action of the fluid present in the pipes 104 and 204.

The continued uncoupling movement takes place owing to a movement of the valve 106 bearing on the fixed central plunger 202C, under the action of the force E1, and the movement of the valve 206 while bearing against the end 112, under the action of the force E2, while the skirt 120 remains abutting against the shoulder 1022, which is possible because the elements 106 and 120 are then no longer axially secured.

The head 202D of the fixed central plunger 202C then ultimately leaves the skirt 120 to reach the end 112, which interrupts the flow of fluid in the coupling 2. The front part 1062 of the valve 106 next leaves the skirt 120 to reach the end 112, to the point that the gasket 114 arrives against the seat 108, which ensures the sealing of the closure of the male coupling element 100. This closing movement of the coupling element 100 takes place with no risk of the gasket 114 being expelled from the groove 1064 due to the relationship L≤ℓ 1064/2 or L≤ℓ 1064/3. The valve 206 reaches the head 202D of the fixed central plunger 202C to the point that the gasket 254 comes into sealed contact with the valve 206 and the gasket 252 comes into sealed contact against the element 202B, which ensures the sealing of the closure of the female coupling element 200.

In the embodiments of FIG. 9 and following, the elements similar to those of the first embodiment bear the same references.

Regarding the second embodiment shown in FIGS. 9 to 11, we primarily describe what distinguishes this embodiment from the previous one.

In this embodiment, the skirt 120 is in one piece with two hitching members 130 formed by hammers positioned inside radial through housings 128 of a rear tab 126 of the skirt. The hammers 130 are each connected to the tubular portion 122 of the skirt 120 by a small tongue 131 resiliently deformable in a radial direction.

The radial dimension of the hammers 130 is greater than the radial height of the housings 128, such that these hammers selectively engage in a groove 1028 arranged in the body 102 of the male coupling element 100, or in a groove 1068 arranged at the periphery of the rod 1066 of the valve 106 of this male coupling element.

For the rest, a first blocking surface S1 is defined at the periphery of the rod 1066, behind the groove 1068, while a second blocking surface S2 is defined by the body 102, behind the groove 1028, this blocking surface S2 delimiting the bore 104 of the body 102 that forms a fluid flow pipe in the coupled configuration of the coupling shown in FIG. 10, where the arrows F represent the fluid stream. During the coupling, the hammers 130 are kept engaged in the groove 1028 by the blocking surface S1 of the valve 106, while the valve 106 is pushed back toward the rear of the male element 100 by the plunger 202C of the female element 200. The groove 1068 arrives across from the hammers 130 while the gaskets 114 and 254 are radially covered by the skirt 120. The continued fitting movement A1 associated with the resilience of each small tongue 131, which tends to return the hammers 130 toward the axis X100, causes the small tongues 131 to deform radially and the hammers 130 to engage in the groove 1068. The skirt 120 and the valve 106 are then moved axially together toward the opening position of the valve 106, with the hammers 130 kept in the groove 1068 by the blocking surface S2 of the body. During coupling and in this coupled configuration, the gaskets 114 and 254, which respectively belong to the male and female coupling elements 100 and 200, are protected with respect to the fluid stream by the skirt 120, the tubular portion 122 of which is radially inserted between these gaskets and this fluid stream.

In this embodiment, the bodies 102 and 202 are each mounted on a plate 102E, respectively 202E. These plates are brought closer to exert a fitting force on the male and female coupling elements 100, in the direction of arrows A1 in FIG. 9, and kept in the coupled configuration relative to one another, without a locking device being provided in the coupling like the bayonet device of the first embodiment. In particular, this approach mode is done with no over-travel.

According to one advantageous aspect of the invention transposable to the embodiments set out below, a stop 150 is provided behind the valve 106 that limits the backward withdrawal movement of the valve 106. This stop 150 is made up of a circlips engaged in an inner peripheral slot 1025 of the body 102. This slot 1025 emerges in the bore 104. This stop 150 is positioned, along the axis X100, so as to receive the pad 1065b of the nut 1065 by bearing in the coupled configuration of the coupling. It is thus guaranteed that, once the skirt 120 is hitched to the valve 106, i.e., once the skirt 120 protects the gaskets 114 and 254, the pressure inside the coupling 2 does not risk driving the equipment formed by the skirt 120 and the valve 106 toward the rear of the male coupling element 100, to the point of exposing the gasket 254. Thus, the skirt 120 cannot be moved toward an axial position where it does not cover the gasket 254. In practice, the stop 150 is positioned, along the axis X100, such that the skirt 120 hitched to the valve 106 cannot be moved toward a position where it does not cover the gasket 254.

More specifically, it is possible to define a maximum axial withdrawal distance for the equipment formed by the skirt 120 and the valve 106 once these elements are hitched. This maximum axial distance must be smaller than or equal to the "exposure" length of the second gasket 254 by the skirt 120 when the skirt 120 and the valve 106 are hitched. The "exposure" length of the second gasket 254 is defined axially between the front edge 120a of the skirt 120 and the rear edge 202F of the groove 202G that surrounds the head 202D and in which the gasket 254 is received.

The coupling 2 of the third embodiment shown in FIGS. 12 to 16 comprises a male coupling element 100 and a female coupling element 200 intended to fit in one another along a central axis X2 of the coupling 2.

The male coupling element 100 is centered on a longitudinal axis X100 that is intended to be combined with the axis X2 during coupling/uncoupling and in the coupled configuration of the coupling 2 and which defines a front/back direction of the male coupling element. The rear of this element 100 is turned toward a pipe, not shown, connected on this element 100, while the front of this element is turned toward the female element 200 at the beginning of coupling.

The female coupling element 200 is also centered on a longitudinal axis X200 that is intended to be combined with the axes X100 and X2 during coupling/uncoupling and in the coupled configuration of the coupling. This axis X200 also defines a front-back direction of the element 200, with the rear of this element 200 turned toward a pipe connected on this element and the front of this element 200 turned toward the male element 100 at the beginning of coupling.

The male coupling element 100 comprises a body 102 that is formed by two tubular elements 102A and 102B and an inner sleeve 102C. The element 102A is provided with an outer thread 138. This body 102 is centered on the axis X100 and pierced with a central bore 104 that defines a fluid flow pipe inside the male coupling element 100, this pipe being closed off by a valve 106 in the closed position of the central bore 104 in the uncoupled configuration of the coupling 2. To that end, a front end 112 of the male coupling element 100 is provided with an inner radial groove 155 in which an elastomeric O-ring 154 is housed. In the closed configuration of the male coupling element 100, the gasket 154 is in sealed contact with an inner radial surface 110 of the body 102 while being radially compressed between the valve 106 and the front end 112 of the body 102. Reference $\ell 155$ denotes the axial width of the groove 155. Reference D110 denotes the diameter of the surface 110 at its portion where the groove 155 is arranged. Reference D6 denotes the diameter of the outer surface of the valve 106 with which the gasket 154 cooperates in the closed position of the valve 106.

In the closed configuration of the male coupling element 100, the gasket 154 bears against the valve 106.

Reference 1067 denotes the front face of the valve 106, which is in the shape of a disc centered on the axis X100. Reference 1127 denotes the front face of the end 112, which is in the shape of an annulus centered on the axis X100. The front faces 1067 and 1127 together constitute the front face 117 of the male coupling element 100. In the uncoupled configuration of the coupling, the front faces 1067 and 1127, which are perpendicular to the axis X100, are planar and flush with one another, such that the front face 117 is planar.

A spring 132 bears, on the front, against the rear of the valve 106 as well as, on the rear, against a peripheral flange of the sleeve 102C. This spring 132 exerts, on the valve 106, a resilient force E1 oriented in the forward direction that tends to return the valve 106 toward its position closing the pipe 104, at the front end 112.

The female element 200 comprises a body 202 centered on the axis X100 and that is provided with a central bore 204 forming a pressurized fluid passage pipe. The body 202 has multiple parts and comprises two tubular elements 202A and 202B, as well as a fixed central plunger 202C immobilized by screwing on a sleeve 202H that is also part of the body 202 and that is in turn axially gripped between the tubular elements 202A and 202B. The fixed central plunger 202C comprises a front part or solid head 202D behind which several radial passages 202t are arranged allowing the flow of the fluid from or to an inner volume of the fixed central plunger 202C that is hollow behind the radial passages 202 I and that extends around the axis X200 to form a portion of the pipe 204. Reference 2027 denotes the front face of the plunger 202C. Reference D202 denotes the diameter of the head 202D of the fixed central plunger 202C. A ring 240, axially secured to the body 202, is mounted freely rotating around this body.

The female coupling element 200 also comprises a valve 206 that is mounted axially movable around the fixed central plunger 202C, radially inside the tubular element 202B and that is elastically charged toward a closed position by a spring 232 that exerts an axial force E2. In its closed position, the valve 206 equipped with a sealing gasket is in sealed contact against the seat 208 formed by the body 202, at an outer radial peripheral surface 211 of the head 202D.

Reference 2067 denotes the front annular face of the valve 206. In the uncoupled configuration of the coupling, the front faces 2027 and 2067, which are perpendicular to the axis X200, are flush with one another, such that the front face 217 of the female coupling element 200 made up of front faces 2067 and 2027 is planar, radially inside the tubular element 202B.

The body 202 is equipped with an elastomeric O-ring 252 installed in an inner peripheral groove arranged on an inner radial surface 210 of the tubular element 202B. Furthermore, the valve 206 is equipped with an elastomeric O-ring 214 installed in an inner peripheral groove 2064 arranged at a front end 2062 of the valve 206. In its closed position, the valve 206 also cooperates sealably with the gasket 252.

Reference $\ell 2064$ denotes the width of the groove 2064 considered along the longitudinal axis X200, D2062 the diameter of the inner cylindrical surface of the front end 2062 and L2062 the axial length of the front end 2062 considered between the front face 2067 and a shoulder 2063 delimiting the front end 2062 in the rear. The diameter D2062 is equal to the diameter D110.

A skirt 220, made in the form of a ring, is mounted around the fixed central plunger 202C, radially inside the valve 206. This skirt 220 comprises a front tubular portion 222, with a circular section, the outer diameter of which is denoted D222, and S222 denotes the outer radial surface, which is cylindrical with a circular section. This surface S222 is stepped. Indeed, the diameter D222 assumes, along the surface $S222_1$ two distinct values, namely a first value $S222_1$ on the front portion $S222_1$ of the surface S222, and a second value $D222_2$, strictly lower than the value $D222_1$, on the rear portion S2222 of the surface S222.

The skirt 220 also comprises a rear flange 226 protruding radially outward relative to the surface S222 and in which six radial housings 228 are arranged to extend radially to the axis X222, which are regularly distributed around the longitudinal axis X200 and which are through housings, i.e., they emerge both inside the skirt 220 toward the axis X200 and outside the latter, in a radial direction. The part of the portion 222 with diameter $D222_2$ is positioned, along the axis X200, between the part with diameter $D222_1$ and the flange 226.

The diameter $D222_1$ is equal to the diameters D6 and D202, which allows the skirt 200 to penetrate inside the body 102 of the male element, after the head 202D of the fixed central plunger 202C, during coupling of the male and female coupling elements 100 and 200.

Reference L222 denotes the axial length of the surface S222. The length L222 is delimited between a front edge 220a of the skirt 220 and the flange 226. The length L222 is greater than or equal to two times the length L2062. Reference L1 denotes the axial distance between the grooves 155 and 2064 when the end 112 is bearing against the valve 206, during coupling/uncoupling of the male and female coupling elements 100 and 200 or in the coupled configuration of the coupling 2.

Reference L2 denotes the axial length of the front part of the portion 222, the outer diameter of which is equal to D221$_1$. The lengths L1 and L2 are chosen such that L2 is less than or equal to L1. Thus, during coupling, the gasket 214 engaged around the skirt 220 has left the front portion S222$_1$ when the gasket 154 engages around the skirt 220 at the rear portion S2222 limiting the friction due to the gaskets during coupling.

Reference L3 denotes the axial length between the front face 1127 and the rear edge of the groove 155. The length L222 is greater than or equal to the sum of the length L2062 and the length L3.

A bead 230 is positioned in each radial housing 228. The diameter of each bead 230 is chosen to be strictly greater than the radial height of each housing 128, i.e., the dimension of this housing measured radially to the axis X200. Each bead 230 positioned in a housing 228 thus protrudes continuously from this housing, either radially outward, or radially inward, relative to the flange 226. Each bead 130 constitutes a member for hitching the skirt 220 to the body 202 or to the valve 206, as shown by the following explanations. In practice, each housing 228 is a radial piercing with a circular section arranged in the flange ring 226 with a diameter slightly larger than the diameter of the bead 230 that it receives. Each bead 230 is therefore axially secured to the skirt 220 and radially movable relative to the body 202 in a housing 228.

The fixed central plunger 202C is provided with an outer radial peripheral groove 2028 intended to receive part of each of the beads 230. Reference S2 denotes the outer radial surface of the fixed central plunger situated behind the groove 1028. Reference D2 denotes the diameter of this surface S2, which is cylindrical with a circular section. This diameter D2 is larger than the groove bottom diameter of the groove 2028. Thus, the groove 2028 forms a hollow housing, radially toward the axis X200, relative to the surface S2. The surface S2 is positioned, along the axis X200, between the groove 2028 and the sleeve 202H.

The part of the seat 208 defined on the peripheral surface of the head 202D is positioned in front of the outlets of the radial passages 2021 on the outer radial surface of the fixed central plunger 202C, while the second blocking surface S2 and the groove 2028 are positioned behind these outlets.

The valve 206 is equipped with an inner radial peripheral groove 2068 that constitutes a hollow housing, radially away from the axis X200, relative to the inner radial surface S1 of the valve 206 behind this groove 2068. Reference D1 denotes the inner diameter of the cylindrical surface S1 with a circular section of the valve 206, which is smaller than the diameter of the groove bottom of the groove 2068.

Figure 12:
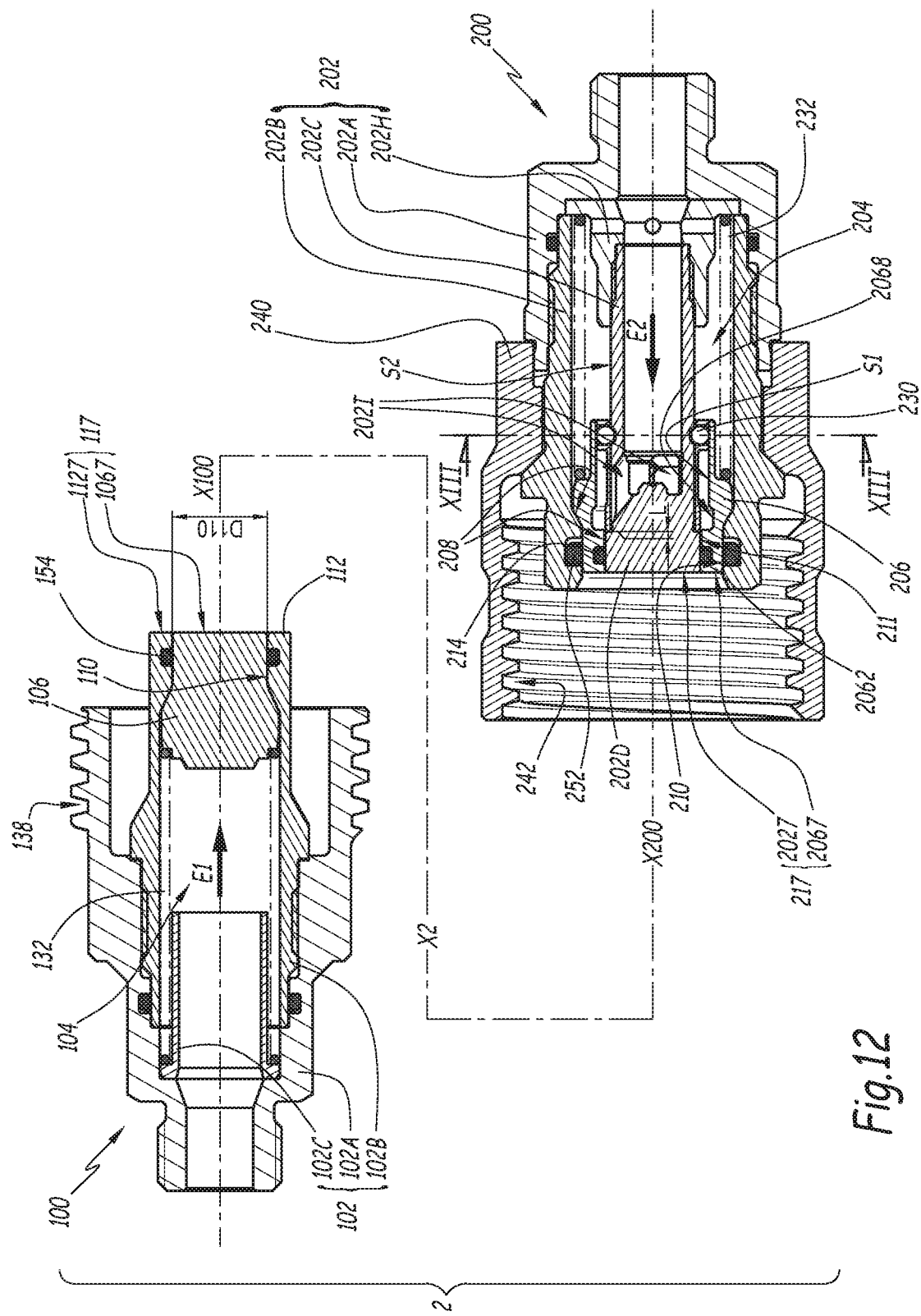
FIG. 12 is a sectional view similar to FIG. 1 for a coupling according to a third embodiment of the invention, the female element of which is also according to the invention.

This coupling 2 works as follows:

In the uncoupled configuration shown in FIGS. 12 and 13, the skirt 220 surrounds the radial passages 2021 of the fixed central plunger 202C. The skirt 220 is axially freed relative to the gasket 214.

In this configuration, the valve 206 is in the closed position of the female coupling element 200. In particular, the gasket 214 cooperates sealably with the outer radial surface of the head 202D while being radially compressed between the valve 206 and the head 202D.

In this uncoupled configuration, the beads 230 are across from the surface S1, such that they are pushed radially back toward the inside of the annular groove 2028, which forms a housing for receiving the inner part of each of these beads. The skirt 220 is thus secured, in translation along the axis X200, with the fixed central plunger 202C, therefore with the body 202.

Reference L denotes the axial distance between the front edge 220a of the skirt 220 and an outer shoulder 2022 of the fixed central plunger that delimits the head 202D toward the rear. In the uncoupled configuration, the front edge 220a of the skirt 220, i.e., the edge of the tubular portion 222 opposite the flange 224, is axially abutting against the outer shoulder 2022. In other words, the distance L is zero. Due to the operating play between the groove 2028 and the beads 230, the front edge 220a can extend at a non-zero small axial distance L from the head 202D. Alternatively, by arranging the axial stop of the skirt 220 toward the front against the fixed central plunger at a distance from the head 202D, like in the first embodiment, for example behind the orifices 2201, it is possible for the axial distance L, defined as above, between the front edge 220a of the skirt and the head 202D not to be zero. Reference $L_{max}$ denotes the maximum value of the distance L when the beads 230 are in their first radial position.

As long as the elements 202 and 220 are secured, the axial distance L measured between the skirt 220 and the head 202D is continuously less than or equal to half, preferably one third, of the width ℓ2064. It is also possible to provide that, in this configuration, the axial distance L is less than or equal to half, preferably one third, of the width ℓ155. In other words, the maximum value $L_{max}$ is less than or equal to ℓ1064/2, preferably to ℓ1064/3.

Figure 14:
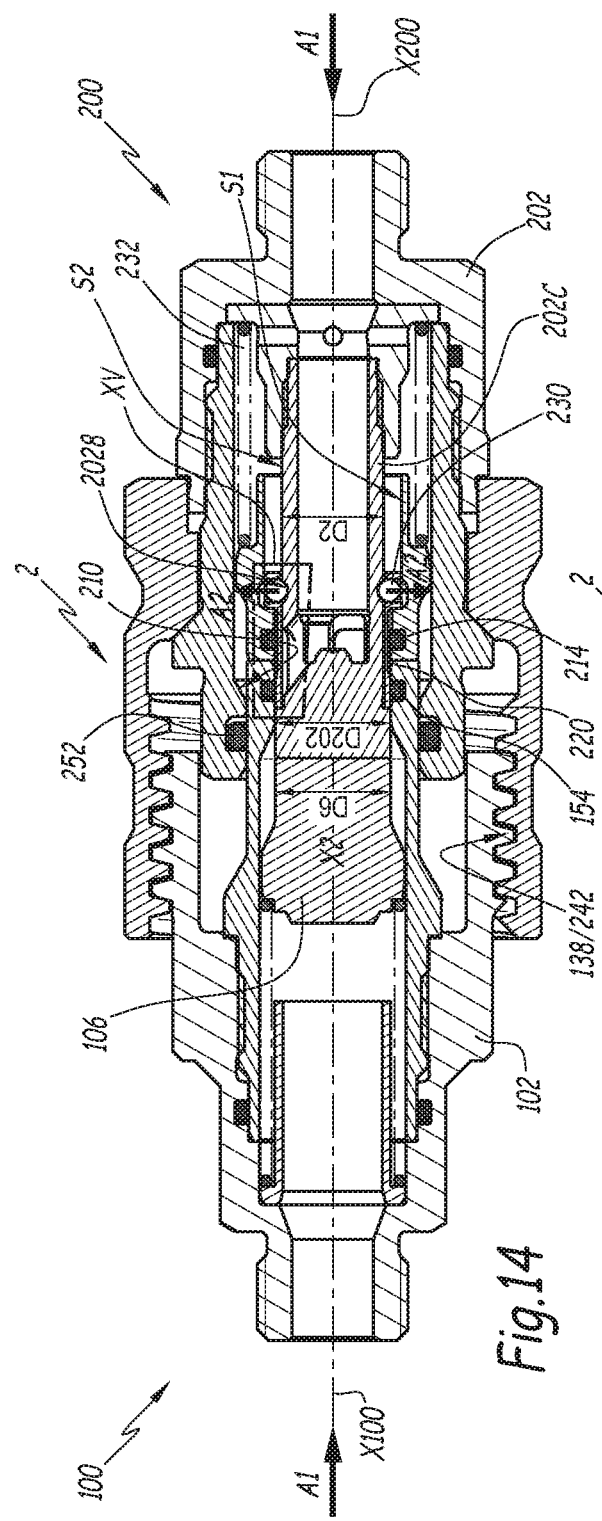
FIG. 14 is a sectional view similar to FIG. 12 when the male and female coupling elements are being coupled.

At the beginning of coupling of the male and female elements 100 and 200, the coupling elements are aligned on the axis X2, then are brought closer to one another in the direction of the arrows A1 in FIG. 14. This results in bringing the front face 2027 of the fixed central plunger 202C into contact with the front face 1067 of the valve 106, while the front face 1127 of the male body is brought into contact with the front face 2067 of the valve 206.

During the coupling of the male and female elements 100 and 200, the valve 106 is pushed back by the fixed plunger 202C toward the rear of the male coupling element 100, against the force E1, to the point that the head 202D penetrates the body 102, toward the rear of this body 102, while driving the skirt 220 with it, which is secured axially to it via beads 230 engaged in the groove 2028. This is in particular possible because the diameters D6, D202 and D222$_1$ are the same. The sealing between the body 202 and the body 102 is taken via the gasket 252. As the head 202D progresses toward the rear of the male coupling element 100, the gasket 214 surrounds the skirt 220, then the gasket 154 in turn surrounds the skirt 220. When the gasket 154 moves axially away from the head 202D, the flow of fluid in the coupling 2 is possible.

This fitting movement of the male and female coupling elements 100 and 200 in one another, in the direction of the arrows A1, takes place due to the screwing of the ring 240 on the body 102, and the cooperation of the thread 138 with the tapping 242.

Because the skirt 220 passes radially inside the gaskets 154 and 214, it protects them against the pressure of the fluid intended to flow in the coupling 2, and against the flow of the fluid when the male and female elements 100 and 200 are actually coupled.

Since the distance L is less than or equal to half, preferably less than or equal to one third, of the width ℓ 2064 in this configuration, the gasket 214 does not risk being driven out of the groove 2064 when it goes from the outside of the head 202D to the outside of the skirt 220.

During the movement of the valve 206 toward the rear of the female element 200, the skirt 220 remains fixed, along the axis X200, relative to the body 202, since it is hitched, via six beads 230, to this body 202, inasmuch as these beads are blocked in the groove 2028 by the geometry of the surface S1.

By continuing the coupling movement in the direction of the arrows A1 and at the same time as the end 112 of the body 102 penetrates the body 202, the gasket 154 leaves the head 202D to engage around the skirt 220. Since the distance L is less than or equal to half, preferably one third, of the width 1155, the gasket 154 also does not risk being driven out of the groove 155 when it passes around the skirt 220.

When the two gaskets 154 and 214 are completely covered by the skirt 220, the valve 206 is pushed back by the end 112 of the body 102, against the force E2, until reaching the position shown in FIGS. 14 and 15 where the inner shoulder 2063 of the valve 206, which forms a rear stop surface, comes into contact with an outer shoulder 223 of the skirt 220 that is formed by the front face of the flange 226. In other words, the valve 206 axially abuts rearward against the skirt 220. In this configuration, the annular groove 2068 is axially aligned with the housings 228, such that the beads 230 can have a centrifugal movement, to engage in the groove 2068. The centrifugal movement of the beads 230 is shown by the arrows A2 in FIGS. 14 and 15.

At the end of the centrifugal movement of the beads 230, their outer radial part is engaged in the groove 2068. The coupling movement of the elements 100 and 200 continues due to the screwing of the ring 240 on the body 102, which results in pushing the fixed central plunger 202C even further into the body 102 and the end 112 of the body 102 into the body 202. This pushes the valves 106 and 206, respectively, even further back toward the rear of the male and female coupling elements 100 and 200. During this additional fitting movement, which corresponds to the passage from the configuration of FIG. 14 to the configuration of FIG. 16, the skirt 220 is translated jointly with the valve 206 and the end 112 of the body 102 bearing thereon, as a result of which the gaskets 154 and 214 continue to be covered radially on the inside by the skirt 220. During this additional movement of the valve 206 toward the rear of the female coupling element 200, this valve and the skirt 220 are hitched by the six beads 230. The outer radial part of the beads 230 is engaged in the groove 2068 and the beads 230, which are aligned with the surface S2, slide or roll on the surface S2. Thus, in this configuration, the beads 230 axially secure the skirt 220 and the valve 206.

Figure 16:
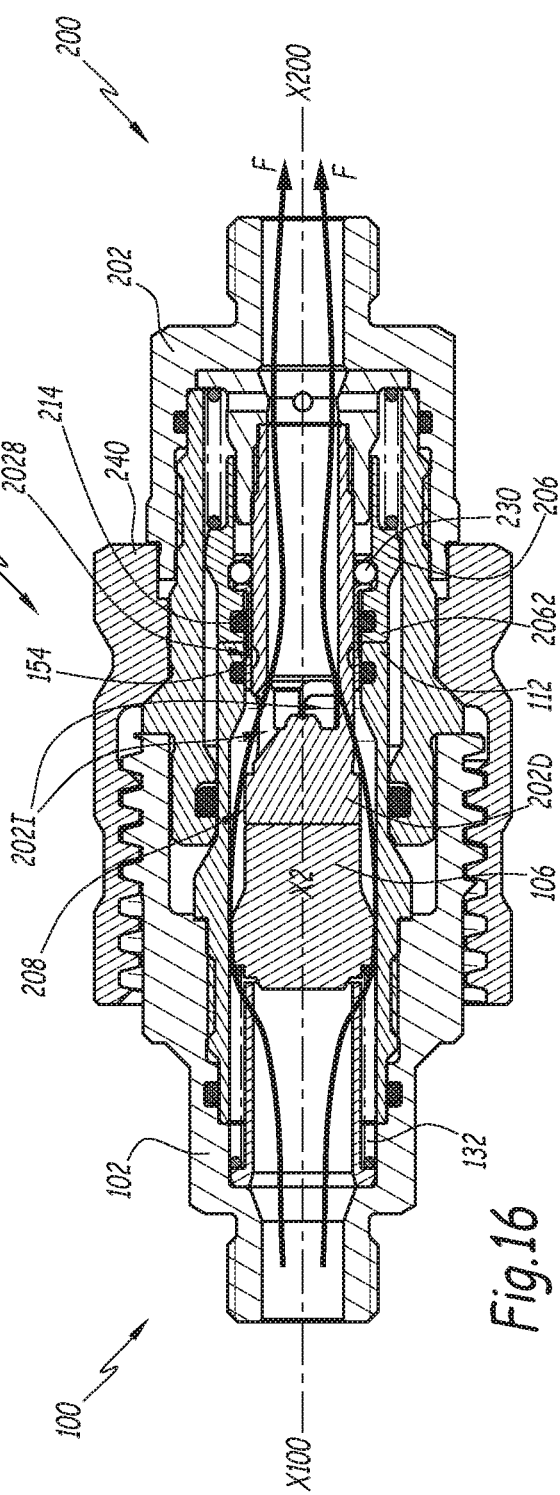
FIG. 16 is a sectional view similar to FIG. 14, in the coupled configuration of the coupling.

This additional movement makes it possible to reach the coupled configuration of FIG. 16, where the body 102 abuts axially against the body 202. The valve 206 is in its open position, and the fluid can flow between the two coupling elements. The beads 230 axially secure the skirt 220 and the valve 206 in a configuration where this skirt effectively protects the gaskets 154 and 214 against the pressure and flow of the main fluid stream shown by the arrows F in this FIG. 16, the skirt 220 being radially inserted between these gaskets and this fluid stream and completely covering, radially by the outside, the grooves 155 and 2064, and therefore the gaskets 154 and 214. The skirt 230 is axially withdrawn toward the rear relative to the through orifices 2021, such that it does not hinder the flow of the fluid stream shown by the arrows F, whereas it effectively protects the gaskets 154 and 214 with respect to this flow.

FIG. 15 shows that the stepped structure of the surface S222, with the diameter $D222_1$ larger than the diameter $D222_2$, such that a minimal radial thickness $(D2062-D222_2)/2$ between the rear portion S2222 and the valve 206 is larger than a minimal radial thickness $(D110-D222_1)/2$ between the front portion $S222_1$ and the front portion 112 of the body 102 when the beads 230 are engaged in the groove 2068 during coupling. In other words, the gasket 214 is less compressed in the groove 2064 than the gasket 154 in the groove 155 when the skirt 220 radially covers the two gaskets 214 and 154. The value of the diameter $D222_1$ is imposed by the value of the diameters D6 and D202. The fact that the diameter $D222_2$ has a smaller value makes it possible for the gasket 214 to be stressed less in the coupled configuration and for its friction on the surface S222 to be less significant during coupling than if the skirt 220 had a diameter, constant over its length L222, equal to the diameter $D222_1$. This increases the lifetime of the gasket 214 and facilitates maneuvering of the coupling both during coupling and uncoupling. In particular, the diameter $D222_2$ can be chosen equal to or slightly smaller than the inner diameter of the gasket 214 in the mounted configuration not compressed in the groove 2064.

The uncoupling takes place according to a reverse maneuver with respect to that described above. The ring 240 is unscrewed relative to the body 102, which causes a withdrawal movement of the male coupling element 100 relative to the female coupling element 200, in the direction opposite the arrows A1. The forces E1 and E2 contribute to separating the coupling elements 100 and 200 from one another by pushing the valves 106 and 206 back toward their respective closing positions. At the beginning of this removal movement, the skirt 220, which is secured to the valve 206 due to the action of the hitching beads 230, follows the movement of this valve by bearing on the front end 112 of the body 102, the valve being pushed back by the resilient force E2 of the spring 232. The spring 232 that exerts the resilient force E2 also acts on the skirt 220 via beads 230.

Due to the joint movement of the skirt 220 and the valve 206, the skirt 220 moves toward the front of the female coupling element 200 and the beads 230 arrive across from the groove 2028, while the skirt 220 arrives abutting against the shoulder 2063, in a configuration comparable to that of FIGS. 14 and 15. The continued removal of the male coupling element 100 with respect to the female coupling element 200 and the force E2 brings the surface S1 of the valve 206 across from the beads 230, which results in engaging the beads 230 again in the groove 2028, following a centripetal movement opposite the movement shown by the arrows A2. This amounts to axially securing the skirt 220 and the body 202, at the fixed central plunger 202C. In this configuration, the gaskets 154 and 214 are still covered by the skirt 220. They are therefore protected against the action of the fluid present in the pipes 104 and 204.

The continued uncoupling movement takes place owing to an additional movement of the valve 206 bearing on the end 112 of the body 102, under the action of the force E2, while the skirt 220 remains axially immobilized on the central plunger 202C, which is possible because the elements 206 and 220 are then no longer axially secured.

The gasket 154 comes back into contact with the head 202D, which results in cutting the flow of fluid in the coupling 2. The valve 206 then finishes by covering the head 202D of the fixed central plunger 202C, to the point that the gasket 214 comes into contact against the part of the seat 208 formed by the outer peripheral surface 211 of this head and the gasket 252 comes into sealed contact against the outer radial surface of the valve 206, which ensures the sealing of the closure of the female coupling element 200. This closing movement of the coupling element 200 takes place with no risk of the gasket 214 being expelled from the groove 2064 due to the following relationship: L≤ℓ 2064.

The fourth embodiment shown in FIGS. 17 to 24 is an alternative of the first and third embodiments in which both the male coupling element 100 and the female coupling element 200 are according to the invention and each comprise a skirt 120, respectively 220, each made in the form of a ring, intended to radially cover a gasket 114, respectively 214, of this element during coupling/uncoupling and in the coupled configuration of the coupling.

Like in the first embodiment, the male coupling element 100 comprises a body 102 centered on an axis X100 and that defines a fluid flow pipe 104 closed off, in the closed configuration, by a valve 106 equipped with an elastomeric O-ring 114 positioned in an outer peripheral groove 1064 arranged on a front part 1062 of the valve 106 and that comes into sealed contact against a seat 108 formed by the body 102, at an inner radial peripheral surface 110 of the front part of the body 102, in the uncoupled configuration. In this closed position, the gasket 114 is radially compressed between the valve 106 and the front end 112 of the body 102. The skirt 120 is visible in perspective view in FIG. 20 and comprises a tubular portion 122 delimiting an inner cylindrical radial surface S122 with a circular section and connected by three connecting tabs 124 with three spurs, or rear tabs, 126 in each of which a through radial housing 128 is arranged. The diameter of the surface S122 is equal to the inner diameter of the inner radial surface 110. The rear tabs 126 are kept abutting forwardly against the body 102 in the uncoupled configuration by a spring 132 exerting an axial force E1 oriented forward on the valve 106. A pair of beads 130 is positioned in each through housing 128, with an inner bead 130a and an outer bead 130b that are aligned and that work like in the first embodiment. These two beads 130a and 130b of the pair of beads 130 are radially movable with respect to the body 102 in the same housing 128 and are axially secured to the skirt 130.

These beads 130a and 130b belong to pairs of beads 130 and are alternately engaged in an outer radial peripheral groove 1068 of the rod 1066 of the valve 106 or in an inner radial peripheral groove 1028 of the body 102, while cylindrical blocking surfaces S1 and S2 with a circular section are provided in the male element 100, like in the first embodiment.

The body 202 of the female element 200 has multiple parts and comprises two tubular elements 202A and 202B, as well as a fixed central plunger 202C. In the female element 200, the skirt 220 is mounted around the fixed central plunger 202C, which belongs to the body 202 of this element, this body defining a fluid flow pipe 204. A valve 206 is mounted sliding along the axis X200 around this fixed central plunger 202C inside the tubular element 202B and is equipped with an elastomeric O-ring 214 positioned in an inner peripheral groove 2064 of the valve 206. The valve 206 is pushed back forward toward its closed position by the axial force E2 of a spring 232. In the uncoupled configuration, in its closed position, the gasket 214 of the valve 206 is in sealed contact against the seat 208 formed by the body 202, at an outer radial peripheral surface 211 of the head 202D. The gasket 214 is radially compressed between the head 202D and the valve 206. In its closed position, a gasket 252 supported by an inner radial peripheral surface 210 of the tubular element 202B is also radially compressed between the valve 206 and the front end of the tubular element 202B, creating sealed contact between the gasket 252 and the valve 206.

A tubular portion 222 of the skirt 220 delimits an outer cylindrical radial surface S222 with a circular section whose diameter is equal to the diameter of the outer radial peripheral surface 211 of the head 202D.

Six beads 230 are respectively received in six through housings 228 arranged in a rear flange 226 of the skirt 220 emerging toward the axis X200. The diameter of these beads 230 is such that they protrude continuously from the radial housings 228, either radially inward or radially outward. Each bead 230 is axially secured to the skirt 220 and radially movable relative to the body 202 in the housing 228.

These beads 230 are alternately engaged in an inner radial peripheral groove 2068 of the valve 206 or in an outer radial peripheral groove 2028 of the fixed central plunger 202C of the body 202, while two blocking surfaces S1 and S2 are provided in the female element 200, like in the third embodiment.

The operation of this coupling is deduced from the explanations provided above regarding the first and third embodiments of the invention.

Figure 17:
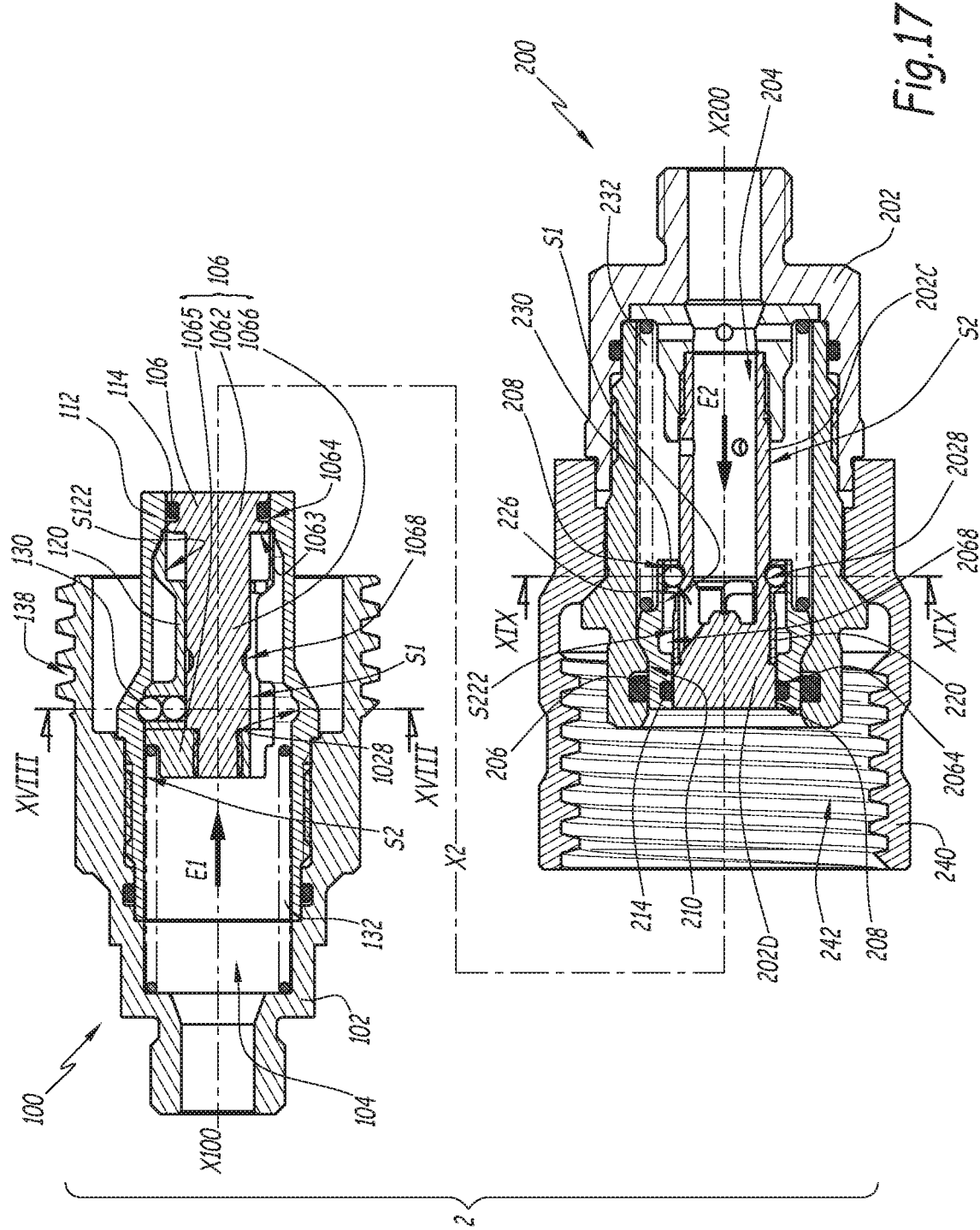
FIG. 17 is a sectional view similar to FIG. 1 for a coupling according to a fourth embodiment of the invention, each of the male and female elements of which is also according to the invention.
Figure 25:
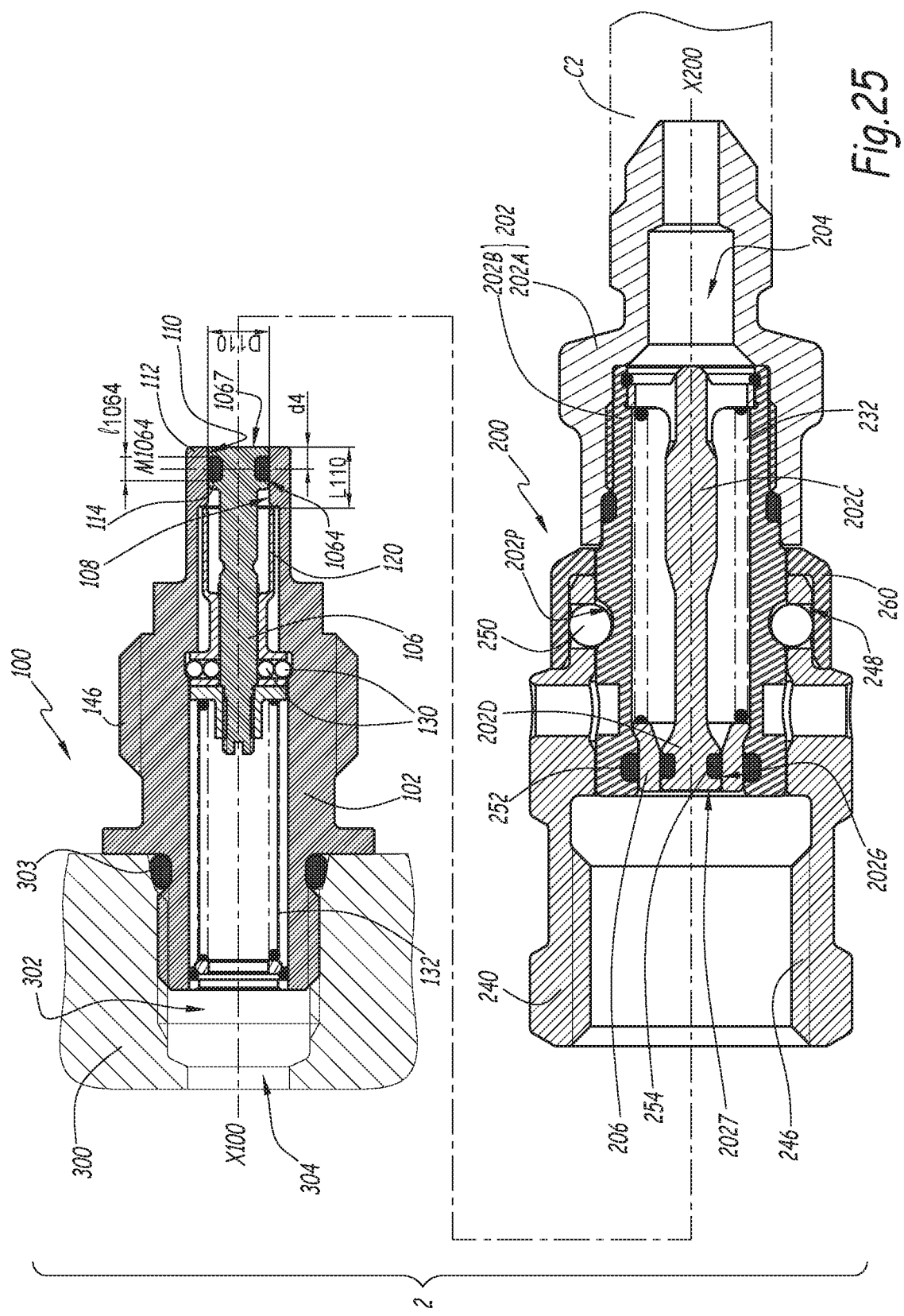
FIG. 25 is a sectional view similar to FIG. 1 for a coupling according to a fifth embodiment of the invention, the male element of which is also according to the invention.

In the uncoupled configuration of FIG. 17, the beads 130 are engaged in the housing 1028 and the beads 230 are engaged in the housing 2028. The skirt 120 is axially freed relative to the gasket 114. The skirt 220 is able to abut forwardly against the head 202D of the fixed central plunger 202C. The skirt 220 is axially freed relative to the gasket 214.

In this configuration of the beads 230, and despite the play between the beads 230 and the housings 228, the skirt 220 is not separated from the head 202D by more than half, preferably a third, of the axial width of the inner peripheral groove 2064. In this configuration of the beads 130, and despite the play between the beads 130 and the housings 128, the skirt 120 cannot be separated from the front part 112 by more than half, preferably a third, of the axial width of the outer peripheral groove 1064.

At the beginning of coupling, the respective longitudinal axes X100 and X200 of the male and female coupling elements 100 and 200 are aligned on a central axis of the coupling X2, and these elements are brought closer in the direction of the arrows A1. The approach of the coupling elements continues owing to the screwing of the inner tapping 242 of a ring 240 of the female coupling element 200 on a thread 138 of the body 102 of the male coupling element 100. In the configuration of FIG. 21, the head 202D of the fixed central plunger 202C has begun to penetrate the front end 112 of the body 102 while pushing the front part 1062 of the valve 106 back inside the skirt 120, such that the gasket 114 is covered, radially by the outside, by the surface S122 of the tubular portion 122 of the skirt 120. The gasket 114 is compressed between the valve 106 and the skirt 120. During the withdrawal movement of the valve 106, the ring 120 does not withdraw inside the body 102, since it is axially secured thereto by the outer beads 130b of the pairs of beads 130 that are engaged in the annular groove 1028, while being stressed radially outward by the surface S1 defined by the valve 106. In parallel, the tubular portion 222 of the skirt 220 covers, radially by the inside, the gasket 214 of the valve 206. The gasket 214 is then compressed between the skirt 220 and the valve 206. More specifically, the valve 206 withdraws under the action of the end 112 of the body 102, which pushes it back against the resilient force E2 exerted by the spring 232, while the skirt 220 retains its position along the axis X200, since it is axially secured to the fixed central plunger 202C by the beads 230, which are engaged in the annular groove 2028, while being radially stressed inward by the surface S1 defined by the valve 206.

The continued fitting movement in the direction of the arrows A1 results in bringing the pairs of beads 130 of the male coupling element 100 across from the groove 1068 of the rod 1066 when the front part 1062 of the valve 106 abuts on the rear, by a rear abutment surface 1063, against a shoulder 123 of the skirt 120, as shown in FIG. 22. The pairs of beads 130 are then movable between their first radial position and their second radial position. In other words, they can then have a centripetal radial movement oriented toward the axis X100, as shown by arrow A2 in FIG. 22, which makes it possible to free the beads 130b from the groove 1028 and to engage the beads 130a in the groove 1068.

In this position, the beads 230 have not yet reached the groove 2068, such that they remain engaged, by the surface S1 of the female coupling element 200, in the groove 2028. In other words, the skirt 120 ceases to be secured axially with the body 102 of the male coupling element 100, while the skirt 220 is still axially secured with the body 202 of the female coupling element 200.

From this position and while continuing the fitting movement, the pairs of beads 130 engage in the slot 1068. While continuing the fitting movement in the direction of the arrows A1, one reaches the configuration of FIG. 23, where the skirt 120 has moved with the valve 106, from the configuration of FIG. 22. The rear shoulder 2063 of the valve 206 comes into contact with the outer shoulder 223 of the skirt 22. The beads 230 arrive across from the annular groove 2068, which allows them to be freed from the groove 2028 with a centrifugal movement shown by arrow A2 in FIG. 23. The configuration of FIG. 23 therefore corresponds to the configuration of FIG. 14 for the third embodiment in which the beads 230 switch from their first position, where they axially secure the elements 220 and 202, to the second position, where they axially secure the elements 220 and 206.

The continued fitting in the direction of the arrows A1 makes it possible to reach the coupled configuration shown in FIG. 24, where the body 102 abuts axially against the body 202 and where the flow of fluid may take place as shown by the fluid streams F. The passage from the configuration of FIG. 23 to the configuration of FIG. 24 takes place via a joint translation of the skirt 120 and the valve 106 inside the male coupling element and the skirt 220 and the valve 206 inside the female coupling element. The pairs of beads 130 and the beads 230 axially secure the two pieces of equipment thus formed while being engaged in the grooves 1068, respectively 2068, and while being stressed by the surfaces S2.

The uncoupling takes place by following the reverse procedure, as explained for the preceding embodiments.

Alternatively, in this fourth embodiment, the male and female coupling elements 100 and 200 can be provided so that, during fitting, the beads 230 go from their first position, in which they axially secure the skirt 220 to the body 202, to their second position, in which they axially secure the elements 206 and 220, at the same time as or before the pairs of beads 130 can go from their first position, in which they axially secure the elements 102 and 120, to their second position, in which they axially secure the elements 106 and 120. Separating the moment when the pairs of beads 130 change between their first and second positions from the moment where the beads 230 change between their first and second positions during coupling, and during uncoupling, makes it possible to limit forces and facilitate the movements of the beads 130, 230.

In this embodiment, the skirt 120 of the male element only radially covers a single gasket from the outside, namely the gasket 114 of the male coupling element 100, during coupling and in the coupled configuration, to the exclusion of a gasket belonging to the female element. Likewise, the skirt 220 of this embodiment only radially covers a single gasket from the inside, namely the gasket 214 of the female coupling element 200, during coupling and in the coupled configuration, to the exclusion of a gasket belonging to the male element. This constitutes a difference with respect to the first and third embodiments, in which the skirts 120 and 220 each cover two gaskets respectively belonging to the male and female elements, at least in the coupled configuration.

In this embodiment, in the coupled configuration shown in FIG. 24, the front part 112 of the body 102 radially surrounds the skirt 220 of the female coupling element 200 and the head 202D is partially received in the skirt 120 of the male coupling element 100. The fact that the body 102 radially surrounds the skirt 220 facilitates the guiding of the male and female coupling elements 100 and 200.

In this embodiment as well, the two gaskets 114 and 214 are effectively protected against the action of the pressurized fluid intended to pass through the coupling 2 and the skirts 120 and 220 do not risk being moved accidentally toward a position where they would expose these gaskets to the action of the fluid, since they are respectively axially secured with the valves 106 and 206 in a position where they completely radially cover these gaskets 114 and 214.

This fourth embodiment makes it possible to use the coupling 2 with its male and female elements 100 and 200 both coupled to pressurized pipes or indifferently with one or the other of these elements coupled to a pressurized fluid pipe, whereas, in the preceding embodiments, the coupling is instead used with the element equipped with the skirt 120 or 220 connected to a pressurized fluid pipe, while the other complementary coupling element is not connected to a pressurized fluid pipe.

Regarding the fifth embodiment shown in FIGS. 25 to 28, we primarily describe what distinguishes this embodiment from that of FIGS. 1 to 8.

In this embodiment, the body 102 of the male coupling element 100 is screwed in a tapped orifice 302 of the plate 300, with an interposed sealing gasket 303. The tapped orifice 302 is connected to a pressurized fluid flow pipe 304. The parts 302 and 304 play the same role as the pipe C1 in the first embodiment.

A valve 106 is positioned in the body 102 while being subject to the action of a spring 132 that tends to return the valve 106 toward a position in which a sealing gasket 114 supported by this valve 106 is in contact with a seat 108 formed by an inner radial surface 110 of the front end 112 of the body 102.

Reference L110 denotes the axial length of the surface 110, i.e., the length of this surface measured parallel to the axis X100 defined as in the first embodiment. Reference D110 denotes the inner diameter of the surface 110, which has a circular section centered on the axis X100.

The sealing gasket 114 is positioned in an outer peripheral groove 1064 of the front part 1062 of the valve 106. Reference $\ell$ 1064 denotes the axial width of the groove 1064 and M1064 denotes its axial middle, defined as a plane perpendicular to the axis X100 and medial between the front and rear edges of the groove 1064.

Reference d4 denotes the axial distance between the axial middle M1064 and the front face 1067 of the valve 106.

The axial length L110 is greater than or equal to twice the axial distance d4. Advantageously, the axial length L110 is strictly greater than twice the axial distance d4, preferably greater than or equal to 2.5 times this distance d4.

A skirt 120 is mounted moving around the valve 106, and beads 130 make it possible to hitch this skirt 120 selectively to the body 102 and the valve 106.

The female element 200 of the coupling 2 of this embodiment comprises a body 202, formed by two tubular elements 202A and 202B screwed on one another, connected to a pipe C2 and which contains a valve 206 mounted around a central plunger 202C that is fixed relative to the body 202. A spring 232 acts on the valve 206 to push it toward the front of the body 202, radially between the head 202D of the plunger 202C and a front portion of the tubular element 202B of the body 202. This front portion and the head 202D are respectively equipped with two sealing gaskets 252 and 254 against which the valve 206 bears in the closed position of the female element 200.

In this embodiment, the ring 240, which is mounted rotating around the body 202, is provided with a tapping 246 intended to cooperate with a corresponding thread 146, provided on the outside of the body 102. Thus, the body 102 can be screwed to the inside of the ring 240. Furthermore, this ring 240 is rotatable around the body 202, blocked axially relative to the body 102, along the axis X200 defined like in the first embodiment and guided in rotation around this body using beads 250 that are engaged in an outer peripheral groove 202P of the body 202, as well as in radial piercings 248 of the ring 240. A ring 260 is mounted around the elements 202 and 240 and keeps the rings 250 in position in the orifices 248.

The sealing gasket 254 is positioned in an outer peripheral groove 202G of the head 202D. Reference M202G denotes the axial middle of the groove 202G, defined as a plane perpendicular to the axis X200 and medial between the front and rear edges of the groove 202G.

Figure 26:
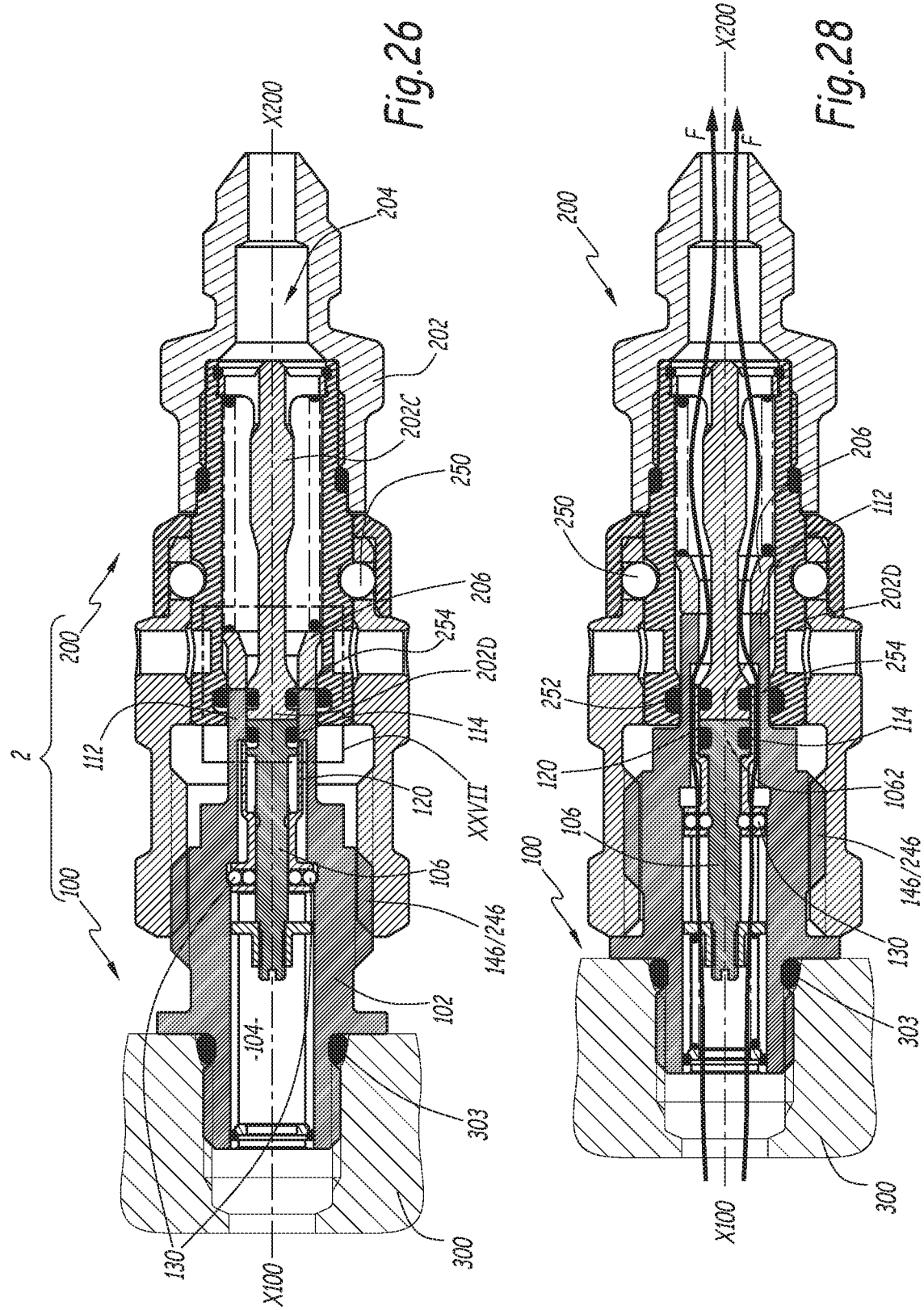
FIG. 26 is a sectional view similar to FIG. 25 during coupling of the coupling elements of the coupling of the fifth embodiment.
Figure 27:
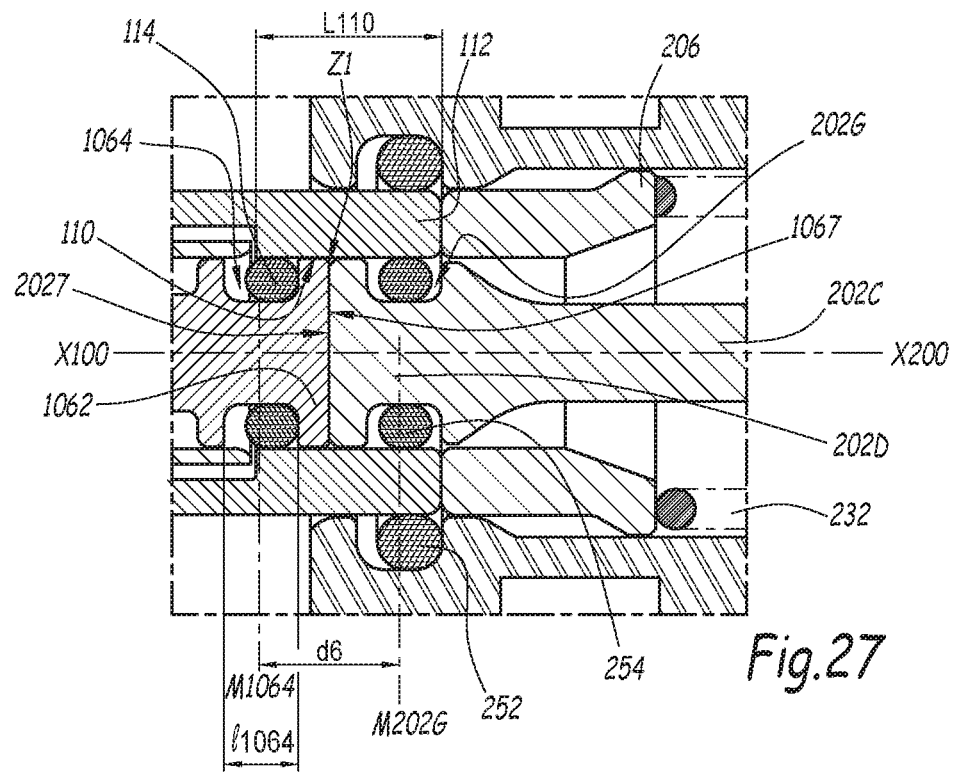
FIG. 27 is an enlarged view of detail XXVII of FIG. 26.

During coupling, the bodies 102 and 202 are aligned along the axis X200 and brought closer, then, as shown in FIGS. 26 and 27, the front face 1067 of the valve 106 bears against the front face 2027 of the plunger 202C.

Reference d6 denotes the axial distance between the axial middles M1064 and M202G in the configuration of FIGS. 26 and 27, i.e., during coupling and when the front faces 1067 and 2027 are in contact with one another. This distance d6 is the same during uncoupling of the elements 100 and 200, when the front faces 1067 and 2027 are in contact with one another. The distance d6 is substantially equal to twice the distance d4; preferably, the distance d6 is 2 to 2.5 times greater than the distance d4.

The length L110 is greater than or equal to the axial distance d6. Advantageously, the length L110 is strictly greater than the axial distance d6, preferably greater than or equal to 1.2 times this axial distance d6.

In other words, the length L110 is elongated relative to the same length considered for the first embodiment, which makes it possible, during coupling, for the gasket 114 to be in sealed contact with the surface 110 as long as the sealing gasket 254 is not in sealed contact with the surface 110 of the body 102. In other words, during coupling, a zone Z1 defined axially between the gaskets 114 and 254, in particular near the front faces 1067 and 2027, does not receive fluid as long as the gasket 254 is not in sealed contact with the body 102, and more particularly, bearing against the surface 110, i.e., as long as the gasket 254 is not protected from any ejection from the groove 202G by its cooperation with the body 102. One thus avoids the risk of pressurized fluid flowing in the zone Z1, which could push the valve 206 back toward the rear of the body 202, against the action of the spring 232, as well as the risks of ejection of the gasket 254 outside the groove 202G. The transitional coupling phase in which the gasket 254 has come into sealed contact with the surface 110, while the gasket 114 is still in sealed contact with the seat 108, is illustrated in FIGS. 26 and 27.

In other words, the length L110 is sufficient so that, during coupling, the sealing gasket 114 remains sealably bearing on the surface 110 as long as the sealing gasket 254 is not bearing sealably against this surface, which effectively prevents any passage of pressurized fluid intended to flow in the coupling 2 at the zone Z1 and the gasket 254.

In the coupled configuration of the coupling 2 shown in FIG. 28, the skirt 120 covers the gaskets 114 and 254, like in the configuration of FIG. 8 for the first embodiment, which protects these gaskets with respect to the flow of pressurized fluid within the coupling 2, this flow being illustrated by the arrows F in FIG. 28.

During the uncoupling of the male and female elements 100 and 200, the surface 110 gradually covers the gasket 254, then the gasket 114. In light of the ratios between the length L110 on the one hand, and the distances d4 and/or d6 on the other hand, the surface 110 covers the gasket 114 before the gasket 254 engages inside the valve 206. In other words, the gasket 114 becomes sealed against the surface 110 forming the seat 108 before the gasket 254 leaves sealed contact with the surface 110 and does not come into contact with the valve 206. This also protects the zone Z1 from a flow of pressurized fluid that could push the valve 206 back toward the rear of the body 202, against the action of the spring 232.

For the other aspects not outlined above, this embodiment works like that of FIGS. 1 to 8. In particular, during coupling and in the coupled configuration, the skirt 120 radially covers the sealing gasket 114 of the valve 106, as well as the sealing gasket 254 of the coupling element 200.

Regarding the sixth embodiment shown in FIGS. 29 to 32, we primarily describe what distinguishes this embodiment from that of FIGS. 12 to 16.

In this embodiment, a seat 208 is formed around the head 202D of the central plunger 202C of the female element 200, so as to receive, by bearing, a sealing gasket 214 supported by the valve 206, which is subject to the action of a return spring 232.

This seat 208 is formed by an outer peripheral surface 211 of the head 202D, the axial length of which is denoted L211.

Furthermore, reference $\ell$ 2064 denotes the axial length of an inner radial groove 2064 of the valve 206 in which the sealing gasket 214 is positioned, and M2064 denotes its axial middle, defined as a plane perpendicular to the longitudinal axis X200 of the female element 200 of the coupling and medial between the front and rear edges of the groove 2064.

Reference d4 denotes the axial distance between the front face 2067 of the valve 206 and the axial middle M2064.

The axial length L211 is greater than or equal to twice the axial distance d4. Advantageously, the axial length L211 is strictly greater than the axial distance d4, preferably greater than or equal to 2.5 times this axial distance d4.

Furthermore, reference M155 denotes the axial middle of the groove 155 in which a sealing gasket 154 is positioned that equips the front end 112 of the body 102 of the male element and that is in contact with a seat 108 formed by the front end 112 of the body 102, when the valve 106 is in the closed position. The axial middle M155 is defined as a plane perpendicular to the longitudinal axis X100 of the male element of the coupling 2, medial between the front and rear edges of the groove 155.

In the coupling or uncoupling configuration of the male and female elements 100 and 200 of the coupling 2, the front face 2027 of the plunger 202C bears against the front face 1067 of the valve 106 of the male element and the front face 1127 of the end 112 of the body 102 comes into contact with the front face 2067 of the valve 206. Reference d6 denotes the axial distance between the axial middles M155 and M2064 in these configurations where the front face 1127 is in contact with the front face 2067. The distance d6 is substantially equal to twice the distance d4; preferably, the distance d6 is 2 to 2.5 times greater than the distance d4. The axial length L211 is greater than or equal to the axial distance d6. Advantageously, the axial length L211 is strictly greater than the axial distance d6, preferably greater than or equal to 1.2 times this axial distance d6.

For the same reasons as those set out above regarding the fifth embodiment, the relative values of the lengths L211 and distances d4 and/or d6 makes it possible, during coupling of the male and female elements 100 and 200, for the sealing gasket 154 to bear sealably against the surface 211, while the sealing gasket 214 is still bearing sealably against this surface, which prevents the pressurized fluid from passing between the body 102 and the head 202D of the plunger 202C in a zone Z1 defined at the interface between the body 102 and the valve 206, in particular near the front faces 2067 at 1127.

Figure 32:
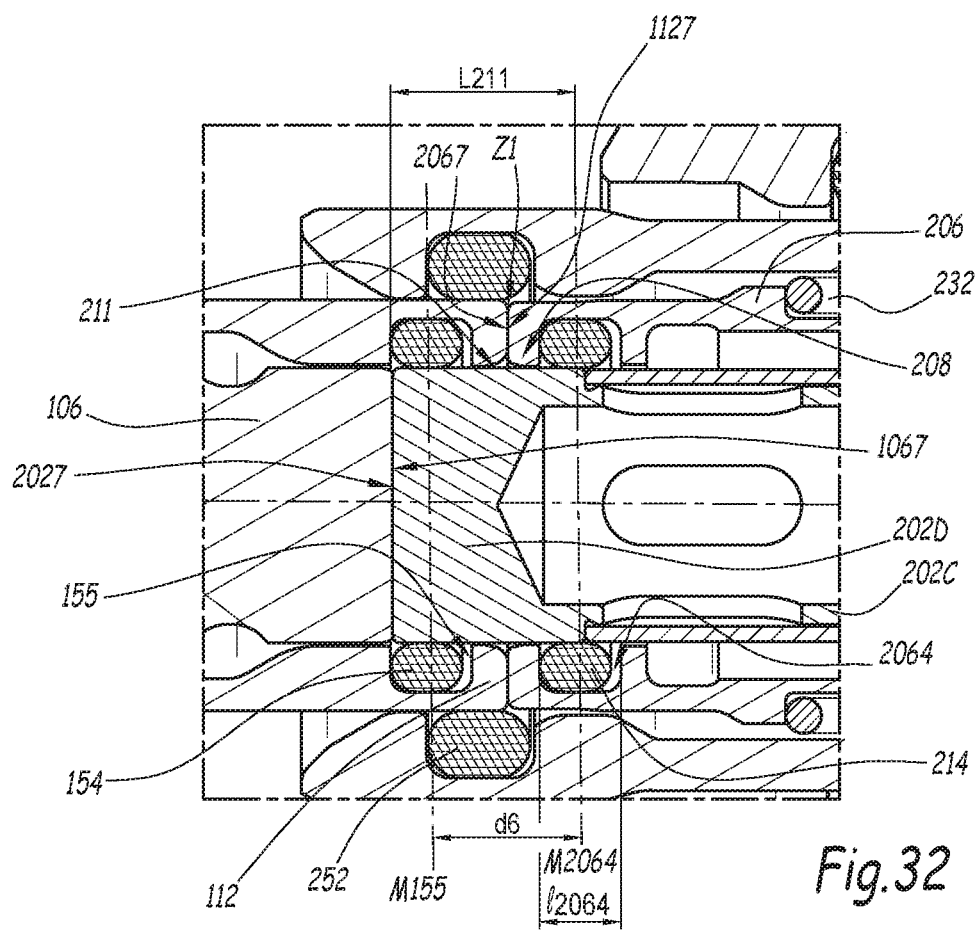
FIG. 32 is an enlarged view of detail XXXII of FIG. 31.

Likewise, during uncoupling of the elements 100 and 200 shown by the arrows A3 and A5 in FIG. 31, in light of the ratios between the length L211 on the one hand, and the distances d4 and/or d6 on the other hand, the sealing gasket 214 comes into sealed contact with the surface 211 before the gasket 154 leaves this surface 211 to come into sealed contact with the valve 106. The transitional uncoupling phase in which the gasket 214 has come into sealed contact with the surface 211, while the gasket 154 is still in sealed contact with the surface 211, is illustrated in FIGS. 31 and 32.

The risks of pressurized fluid flowing in a zone Z1 defined like in the fifth embodiment and of movement of the valve 106 toward the rear against the spring 132 under the force of the pressure from the fluid flowing in Z1, which would lead to the accidental ejection of the gasket 154 outside the groove 155, are therefore minimized.

If we adopt the notations used for the embodiment of FIGS. 12 to 16, the relationship expressed above between the axial length L211 and the axial distance d6 can be expressed in the form L211≥ℓ155/2+L1+ℓ2064/2.

The body 102 of the male element is made up of a tubular body 1028 that houses the valve 106 and that is sandwiched axially between a plate 300 comparable to that of the fifth embodiment, and a tubular body 102A that surrounds the body 102B and that is screwed into a tapping of an orifice 302 of the plate 300, with the possibility of oscillation of the body 102B relative to the body 102A and the plate 300. A first sealing gasket 303 is positioned between the body 102B and an inner peripheral surface of the orifice 302 in which the body 102A is engaged and in which a fluid flow pipe 304 emerges. A second sealing gasket 305 is positioned between the bodies 102A and 102B, in front of the gasket 303 along the axis X300. The sealing gasket 303 ensures the sealing of the pipe 104, formed in the body 102B, and of the pipe 304 when the valve 106 is in the closed position, in contact with a seat 108 formed by the front end 112 of the body 102. These sealing gaskets 303 and 305 are resiliently deformable and also return the body 102B to the neutral position, where the central axis X102B of the body 102B is coaxial with the central axis X102A of the body 102A in the uncoupled configuration. This configuration is shown in FIG. 29.

The body 202 of the female element 200 is made up of a tubular body 202B that houses the valve 206 and that is sandwiched axially between a plate 500 and a tubular body 202A screwed into a tapping of an orifice 502 of the plate 500, in which a pressurized fluid flow pipe 504 emerges. The parts 502 and 504 play the same role as the pipe C2 in the first embodiment. A first sealing gasket 503 is positioned between the tubular body 202B and an inner peripheral surface of the orifice 502, while a second sealing gasket 505 is positioned between the tubular bodies 202A and 202B forming the body 202, in front of the gasket 503 along the axis X200. The gaskets 503 and 505 allow the oscillation of the body part 202B in the body 202A. The gasket 503 ensures the sealing of the inner pipe 204 of the female element 200 and of the pipe 504, when the valve 206 is in the closed position in contact with the seat 208.

Like the gaskets 303 and 305, the gaskets 503 and 505 are resiliently deformable and by default return the body part 202B to a neutral position, where its central axis X202B is coaxial with the central axis X202A of the body part 202A, in the uncoupled configuration.

Figure 29:
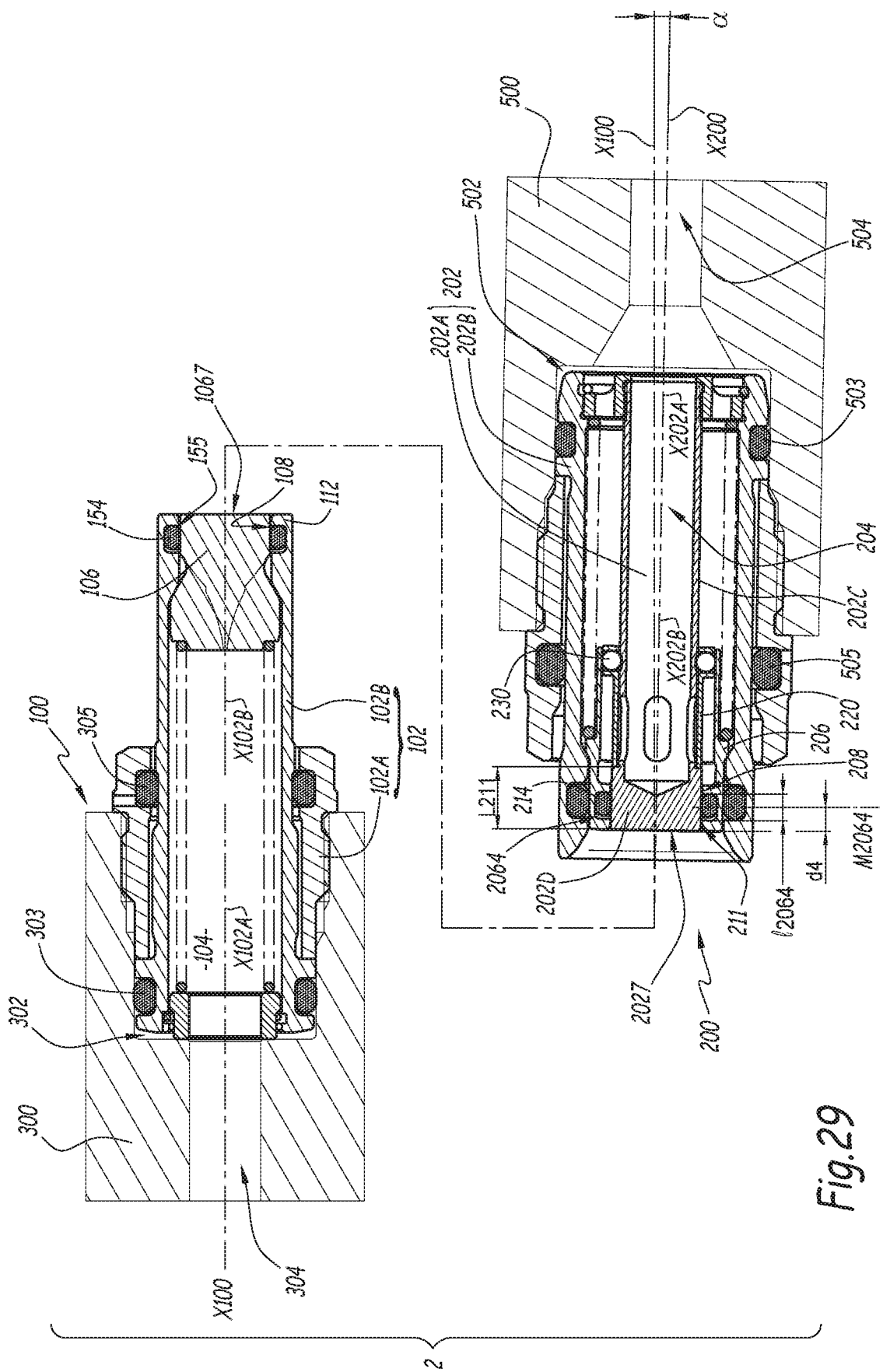
FIG. 29 is a sectional view similar to FIG. 1 for a coupling according to a sixth embodiment of the invention, the female element of which is also according to the invention.

As shown in FIGS. 29, 30 and 31, in particular by the offset angle α in FIG. 29, the body parts 102B and 202B may not be perfectly aligned before being fitted in one another. The assembly mode of the bodies 102 and 202 on the plates 300 and 500 makes it possible to accommodate such a misalignment and to align the body parts 102B and 202B automatically during coupling, with no jamming risk. Thus, the bodies 102B and/or 202B become inclined with respect to the bodies 102A, respectively 202A, to allow an alignment of the axes X102B and X202B.

For the other aspects not outlined above, in particular regarding the skirt 220 and the beads 230, this embodiment works like that of FIGS. 12 to 16. In particular, during coupling and in the coupled configuration, the skirt 220 radially covers the sealing gasket 214 of the valve 206, as well as the sealing gasket 154 of the coupling element 100.

Irrespective of the embodiment, the invention makes it possible to guarantee the initial position, the position during coupling and the final position of the skirt 120 and/or 220 with respect to the gasket 114 or 214 that it must cover. The invention also guarantees that the skirt 120 or 220 can completely cover the gasket 114 or 214 that it must cover. This is not the case with the equipment of EP-A-0,621,430 if the friction of the gasket on the skirt exceeds the resilient forces exerted by the corresponding spring or if a spring pushing back a skirt is defective.

The invention also makes it possible to guarantee effective protection of the gasket 114 or 214 if pressure is applied by the fluid in the open position of the corresponding valve. Indeed, irrespective of the embodiment, the skirt remains secured to the valve belonging to the same coupling element in the fully open position of the valve.

Furthermore, relative to EP-A-0,621,430, the construction is simplified by the elimination of at least one spring in each coupling element equipped with a skirt.

By arranging the blocking surfaces S1 and S2 and the receiving housings 1068 or 2068, 1028 or 2028, of the hitching member 130 and/or 230, respectively on the valve and on the body, one guarantees the precision of the sequencing of the hitching.

Because the skirt 120 and/or 220 is able to abut forwardly against the body in the first radial position of the hitching member corresponding to a cooperation of the hitching member with the annular housing of the body, the sequencing of the hitching during uncoupling is made easier.

By providing a maximum value $L_{max}$ of the distance L less than or equal to half or a third of the axial width of the receiving groove of the gasket as long as the hitching member is in its first radial position, one ensures that the gasket remains covered enough by the skirt and/or the body, which guarantees that it is not expelled from its groove by the pressure of the fluid upon coupling and uncoupling. In particular, it is possible to provide a maximum value $L_{max}$ of the distance L of less than or equal to 0.5 mm, preferably less than or equal to 0.3 mm, when the O-ring to be covered by the skirt has a toroid diameter greater than or equal to 1 mm.

The rear abutment of the valve against the skirt guarantees the movement of the hitching member without jamming from its first radial position toward its second radial position corresponding to a cooperation of the hitching member with the annular housing of the valve.

When the covering surface of the skirt has the same diameter as the seat of the gasket in the closed position of the valve, the gasket expulsions and stresses on the gasket are limited.

The pair of beads 130 makes it possible to limit the axial dimension of the radial housing traversing the skirt.

According to an alternative of the invention that is not shown, the beads or pairs of beads 130 or 230 can be replaced by elongated pegs or pins that slide with a movement having at least one radial component in the housings 128 or 228 of the skirt, with the radial dimension of each peg or pin strictly greater than the radial height of the housing in which it is installed.

Aside from locking by bayonet and by screwing male and female coupling elements, which can be used in all of the embodiments of the invention, other types of locking of the male and female elements on one another can be considered, in particular locking using locking members such as beads, fingers or segments, associated with an axially movable locking ring and movable in the body of the female element, between a locked position axially cooperating with the body of the male element and an unlocked position in which the locking members do not oppose the movement of the body of the male element in the body of the female element, or using the plates respectively secured to the male coupling element and the female coupling element and maintained relative to one another in the coupled configuration of the coupling.

If the female coupling element 200 is equipped with a skirt 220, it is possible to provide that the valve 206 is provided with a part protruding radially toward the axis X200, which allows it to abut forward against the skirt 220 in the uncoupled configuration, instead of abutting against the body 202.

Alternatively, the flow direction of the fluid within the coupling 2 can be the opposite of that shown by the arrows F in FIGS. 8, 10, 16 and 24.

Irrespective of the embodiment, the number and distribution of the hitching members 130 and 230 can be adapted based on the geometry of the coupling 2 and of the pressure and/or flow rate of the fluid passing therein. This number is greater than or equal to 1. The embodiments and alternatives considered above may be combined with one another to create new embodiments, in the context of the attached claims. In particular, a hitching member of the type of the second embodiment, in a single piece with the skirt, can be implemented in the third and fourth embodiments. Furthermore, a rear stop to the movement of the valve when it is hitched to the skirt, of the type of the second embodiment, can be implemented in the third embodiment. Additionally, a variation in the diameter of the outer radial surface S222 of the skirt of the third embodiment can be implemented at the inner radial surface of the skirt in the first embodiment.

The invention claimed is:

1. A fluid coupling element, comprising:
a body delimiting a fluid flow pipe, the body centered on a longitudinal axis;
a valve with a radial peripheral groove receiving a sealing gasket, this valve being axially movable relative to the body between
a closed position, in which the gasket of the valve is in contact with a corresponding seat formed by the body, and
an open position, in which the gasket is not in contact with the seat;
a member for resiliently returning the valve toward the closed position;
a skirt positioned inside the body and axially movable relative to the valve between
a first axial position, in which the skirt is axially released relative to the gasket, and
a second axial position, in which the skirt radially covers the gasket; and
at least one hitching member axially secured to the skirt and radially movable with respect to the longitudinal axis relative to the body between
a first radial position, in which the at least one hitching member axially secures the skirt and the body, and allows a relative axial movement of the skirt with respect to the valve, between the first axial position and the second axial position, and
a second radial position, in which the at least one hitching member axially secures the skirt and the valve, and allows a relative axial movement of the skirt with respect to the body, wherein the skirt radially covers the gasket.

2. The coupling element according to claim 1, wherein:
the valve comprises a first blocking surface for blocking the at least one hitching member in the first radial position, as well as a first receiving housing for receiving part of the at least one hitching member in the second radial position, the first receiving housing being adjacent along the longitudinal axis to the first blocking surface; and
the body comprises a second blocking surface for blocking the at least one hitching member in the second radial position, as well as a second receiving housing for receiving part of the at least one hitching member in the first radial position, the second receiving housing being adjacent along the longitudinal axis to the second blocking surface.

3. The coupling element according to claim 2, wherein, in an uncoupled configuration, the valve is in the closed position, the skirt is in the first axial position and the at least one hitching member is kept in the first radial position by the first blocking surface of the valve, while the first receiving housing is positioned in front of the first blocking surface towards a coupling direction along the longitudinal axis and wherein the second receiving housing is positioned in front of the second blocking surface towards the coupling direction.

4. The coupling element according to claim 1, wherein the skirt is configured to abut forward against the body towards a coupling direction along the longitudinal axis, while the at least one hitching member is in the first radial position.

5. The coupling element according to claim 1, wherein when the at least one hitching member is in the first radial position, the maximum value of an axial distance, measured between the skirt and a part of the body forming the seat, is less than or equal to half of the width of the radial peripheral groove receiving the gasket, measured parallel to the longitudinal axis.

6. The coupling element according to claim 5, wherein said maximum value is less or equal to one third of the width of said radial peripheral groove.

7. The coupling element according to claim 1, wherein a surface of the valve is able to abut rearward away from a coupling direction along the longitudinal axis against the skirt in a configuration where the at least one hitching member is able to come into the second radial position.

8. The coupling element according to claim 1, wherein the skirt is provided with a tubular portion forming a cylindrical radial surface with a circular section radially covering the gasket and wherein a diameter of this surface is equal to a diameter of a part of the body forming the seat.

9. The coupling element according to claim 1, wherein the skirt is equipped with a radial through housing, in which the at least one hitching member is movable and wherein the at least one hitching member has a radial dimension larger than a radial dimension of the radial through housing.

10. The coupling element according to claim 1, wherein the axial length of a surface of a part, which constitutes the seat formed by the body, is greater than or equal to twice an axial distance between the axial middle of the radial peripheral groove for receiving the sealing gasket on the one hand, and a front face of the valve on the other hand.

11. The coupling element according to claim 1, wherein:
the radial peripheral groove receiving the sealing gasket is an outer radial peripheral groove of a front part of the valve;
the valve comprises a rod with a radial thickness smaller than a radial thickness of the front part;
the skirt is mounted around the valve;
in the first radial position, the at least one hitching member cooperates with an inner annular groove of the body; and
in the second radial position, the at least one hitching member cooperates with an outer annular groove of the rod.

12. The coupling element according to claim 1, wherein:
the radial peripheral groove receiving the sealing gasket is an inner radial peripheral groove of the valve, wherein the body comprises
a fixed central plunger that forms the seat, and
a tubular element provided with a second sealing gasket;
the valve is mounted sliding around the fixed central plunger and inside the tubular element;
in the closed position, the second gasket is in contact with the valve;
the skirt is mounted, radially with respect to the longitudinal axis, between the fixed central plunger and the valve;

in the first radial position, the at least one hitching member cooperates with an outer annular groove of the fixed central plunger; and
in the second radial position, the at least one hitching member cooperates with an inner annular groove of the valve.

13. A fluid coupling for joining pressurized fluid pipes, comprising a male coupling element and a female coupling element, wherein at least one of the male and female coupling elements is according to claim 1.

14. The coupling according to claim 13, wherein only a first coupling element, from among the male element and the female element, is according to claim 1, wherein the valve of the first coupling element is able to be moved toward the open position by a body of the second coupling element, from among the male element and the female element, and wherein, in a coupled configuration, the skirt of the first coupling element is able to radially cover the sealing gasket of the valve of the first coupling element as well as a sealing gasket received in a radial peripheral groove of the body of the second coupling element.

15. The coupling according to claim 14, wherein an axial length of a surface of a part that makes up the seat formed by the body of the first coupling element is greater than or equal to an axial distance measured, when the first and second elements of the coupling are being coupled or uncoupled, and when a front face of the valve of the first coupling element is in contact with the body of the second coupling element, between an axial middle of the radial peripheral groove of the valve of the first coupling element on the one hand, and an axial middle of the radial peripheral groove of the body of the second coupling element on the other hand.

16. The coupling according to claim 15, wherein the axial length of the surface of the part that makes up the seat is strictly greater than the axial distance measured between the axial middles of the grooves.

17. The coupling according to claim 16, wherein the axial length is greater than or equal to 1.2 times said axial distance.

18. The coupling according to claim 15, wherein, during coupling of the male and female elements of the coupling, the sealing gasket of the first coupling element is in sealed contact with the surface of the part that makes up the seat and prevents the pressurized fluid from passing between the fluid flow pipe and the front face of the valve, as long as the sealing gasket of the second coupling element is not in sealed contact with the body of the first coupling element.

19. The coupling according to claim 15, wherein, during coupling of the male and female elements of the coupling, the sealing gasket of the first coupling element is in sealed contact with the surface of the part that makes up the seat before the sealing gasket of the second coupling element leaves sealed contact with the body of the first coupling element.

20. A fluid coupling for joining pressurized fluid pipes, comprising a male coupling element and a female coupling element, wherein
the male coupling element is according to claim 1;
the female coupling element is according to claim 1;
in a coupled configuration of the fluid coupling, the hitching members of the male and female coupling elements are each in their second radial position and the valves of the male and female coupling elements are each in their open position.

* * * * *